(12) United States Patent
Brossard et al.

(10) Patent No.: US 11,595,218 B2
(45) Date of Patent: Feb. 28, 2023

(54) AUTHORIZATION DELEGATION

(71) Applicant: Arm Limited, Cambridge (GB)

(72) Inventors: Mathias Sven Lucien Alain Brossard, Austin, TX (US); Brendan James Moran, Histon (GB)

(73) Assignee: Arm Limited, Cambridge (GB)

( * ) Notice: Subject to any disclaimer, the term of this patent is extended or adjusted under 35 U.S.C. 154(b) by 429 days.

(21) Appl. No.: 16/909,049

(22) Filed: Jun. 23, 2020

(65) Prior Publication Data

US 2021/0399903 A1 Dec. 23, 2021

(51) Int. Cl.
| | |
|---|---|
| *H04L 9/32* | (2006.01) |
| *H04L 9/08* | (2006.01) |
| *G06F 21/64* | (2013.01) |
| *H04L 9/40* | (2022.01) |
| *H04L 9/14* | (2006.01) |
| *G06F 21/60* | (2013.01) |
| *H04L 9/00* | (2022.01) |

(52) U.S. Cl.
CPC .......... *H04L 9/3265* (2013.01); *G06F 21/602* (2013.01); *G06F 21/64* (2013.01); *H04L 9/0861* (2013.01); *H04L 9/14* (2013.01); *H04L 63/0428* (2013.01); *H04L 9/50* (2022.05)

(58) Field of Classification Search
CPC ....... H04L 9/3265; H04L 9/0861; H04L 9/14; H04L 63/0428; H04L 9/50; H04L 9/321; H04L 9/3242; H04L 2463/061; H04L 9/3247; H04L 63/0823; H04L 63/123; G06F 21/602; G06F 21/64; G06F 21/604
See application file for complete search history.

(56) References Cited

U.S. PATENT DOCUMENTS

| | | | |
|---|---|---|---|
| 7,181,620 B1 * | 2/2007 | Hur | ........................ H04L 63/061 713/168 |
| 8,687,813 B2 | 4/2014 | Bar-El | |
| 9,231,758 B2 | 1/2016 | Bar-El et al. | |
| 2018/0232522 A1 * | 8/2018 | Shear | ...................... G06F 21/31 |
| 2020/0344072 A1 * | 10/2020 | Yan | ........................ H04L 9/3268 |

\* cited by examiner

*Primary Examiner* — Abiy Getachew
(74) *Attorney, Agent, or Firm* — Nixon & Vanderhye P.C.

(57) ABSTRACT

Apparatuses, systems, methods, and software are disclosed for authorization delegation. In a participant device a derivative key is generated in dependence on a received key. An authenticity check value for a delegation information block is generated in dependence on the delegation information block and the received key. The derivative key is derived in dependence on the delegation information block and the received key. An extended certificate chain is created comprising a received certificate chain appended with a local certificate, which comprises the delegation information block and the authenticity check value.

24 Claims, 19 Drawing Sheets

AUTHORIZATION DELEGATION

TECHNICAL FIELD

The present disclosure relates to data processing. In particular, the present disclosure relates to the delegation of authorization from one apparatus to another.

DESCRIPTION

Many systems comprising multiple entities have a need for security in the information exchanges between those entities, which may take place via non-secure communication channels. One approach to this security requirement is the use of an asymmetric key pair, of which a public key is freely distributed and a private key is kept private. The holder of the private key can sign a message using the private key, which the recipient of the message can then verify as having come from the holder of the private key by using the public key. Nevertheless, whilst such approaches can ensure a suitable level of security in a wide range of systems, the public-key cryptographic algorithms involved can be relatively resource-intensive (in terms of the memory, program code size, silicon area, power, network traffic etc. required), which may be disadvantageous in devices where such resources are constrained.

SUMMARY

In one example embodiment described herein there is an apparatus comprising: authorization delegation circuitry to generate a derivative key in dependence on a received key, wherein the authorization delegation circuitry comprises: authentication code generation circuitry to generate an authenticity check value for a delegation information block in dependence on the delegation information block and the received key; and key derivation circuitry to generate the derivative key in dependence on the delegation information block and the received key; and certificate concatenation circuitry to generate an extended certificate chain, wherein the extended certificate chain comprises a received certificate chain appended with a local certificate, wherein the local certificate comprises the delegation information block and the authenticity check value.

In one example embodiment described herein there is a system for authorization delegation comprising: multiple delegation entities, wherein each delegation entity of the multiple delegation entities comprises: authorization delegation circuitry to generate a derivative key in dependence on a received key, wherein the authorization delegation circuitry comprises: authentication code generation circuitry to generate an authenticity check value for a delegation information block in dependence on the delegation information block and the received key; and key derivation circuitry to generate the derivative key in dependence on the delegation information block and the received key; and certificate concatenation circuitry to generate an extended certificate chain, wherein the extended certificate chain comprises a received certificate chain appended with a local certificate, wherein the local certificate comprises the delegation information block and the authenticity check value, wherein the multiple delegation entities are arranged in a serial chain, such that the derivative key and the extended certificate chain of an earlier delegation entity in the serial chain are the received key and the received certificate chain of a subsequent delegation entity in the serial chain.

In one example embodiment described herein there is a method for authorization delegation comprising: receiving a received key; receiving a received certificate chain; generating an authenticity check value for a delegation information block in dependence on the delegation information block and the received key; generating a derivative key in dependence on the delegation information block and the received key; and generating an extended certificate chain, wherein the extended certificate chain comprises the received certificate chain appended with a local certificate, wherein the local certificate comprises the delegation information block and the authenticity check value.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
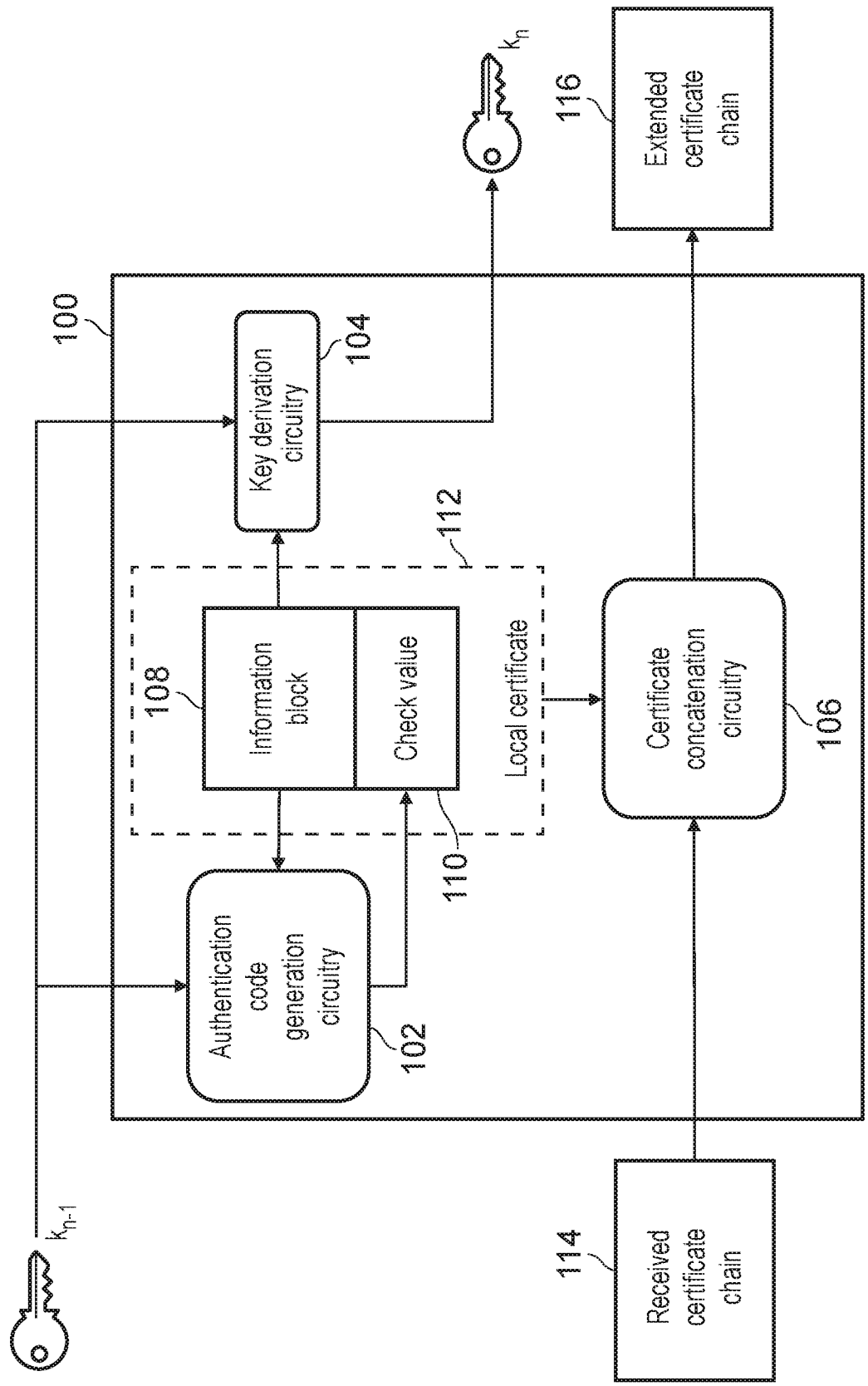
FIG. 1 schematically illustrates an apparatus in accordance with some embodiments.

Before discussing the embodiments with reference to the accompanying figures, the following description of embodiments is provided.

In accordance with one example configuration there is provided an apparatus comprising: authorization delegation circuitry to generate a derivative key in dependence on a received key, wherein the authorization delegation circuitry comprises: authentication code generation circuitry to generate an authenticity check value for a delegation information block in dependence on the delegation information block and the received key; and key derivation circuitry to generate the derivative key in dependence on the delegation information block and the received key; and certificate concatenation circuitry to generate an extended certificate chain, wherein the extended certificate chain comprises a received certificate chain appended with a local certificate, wherein the local certificate comprises the delegation information block and the authenticity check value.

The present techniques propose an authorization delegation mechanism according to which trusted authorization can be passed along a series of apparatuses. These techniques are based on the realisation that a public key infrastructure (PM), whilst well-established and trusted, is reliant on the use of public key cryptographic algorithms, which can be to resource hungry (for example in terms of the memory required, the program code size involved, the silicon area taken up, the power consumption incurred, the network traffic generated, and so on) for constrained devices. Here the term constrained devices is used to refer to those devices in which the above-mentioned resources must be carefully conserved. One example field in which such constrained devices exist is that of the "Internet of Things" (IoT), where many of the participant devices may be extremely limited in terms of their memory capacity, their ability to use power, their freedom to exchange network traffic with other devices, and so on. Accordingly in this context a symmetric key infrastructure is proposed herein, where the term "symmetric" is used because the same key is used both to create a check value to associate with a data item and to verify that data item/check value pair. It will therefore be understood that under this arrangement a difference to the PKI mentioned above is that validation (verification) can only be performed by trusted parties, since this process requires knowledge of a trusted root key used in the system.

Under the arrangement presented herein, a secure mechanism for authorization delegation between apparatuses is provided, in which each participating apparatus in a serial chain of authorization delegation receives a key and bases two operations on that key and on a delegation information block. One operation generates a check value to associate with the delegation information block and another operation uses the delegation information block as an input to a key derivation function to generate a derivative key. The derivative key and the delegation information block with its associated check value are then passed on to a subsequent apparatus in the serial chain. The delegation information block and its associated check value are together referred to as a local certificate herein, and the local certificate is passed to the subsequent (delegate) apparatus and serial chain concatenated with a received certificate chain. Accordingly it should be understood that as such the certificates herein differ from those certificates used in a PKI. Nevertheless the same overall structure of a certificate may usefully (for various compatibility reasons) still be used, but where the public key part of the certificate can simply be left empty. In a variant it could also be set to a random value (nonce) to further enhance the security of the system by allowing the same authorization delegation to two separate delegate entities, which would receive distinct (i.e. different from one another) certificates and keys. Accordingly a first apparatus in the serial chain generates its own local certificate to which each subsequent apparatus appends its own local certificate, thus forming a growing certificate chain. The certificate chain thus provides an authentication link between the trusted root authority and each delegate apparatus in the serial chain.

Further, the manner in which the operation of the authentication code generation circuitry is dependent on the received key and the manner in which the operation of the key derivation circuitry is dependent on the received key may vary. For example, the authentication code generation circuitry may be arranged to generate the authenticity check value using a message authentication code (MAC) function, where the MAC function (especially in the context of a resource constrained IoT device) may be based on a hardware implemented cryptographic primitive, for example using a hash function based MAC (HMAC) or using a block cipher based MAC (CMAC). Similarly the key derivation circuitry (especially in the context of a resource constrained IoT device) may be implemented to use the MAC function used by authentication code generation circuitry (thus saving on the amount of code needing to be stored in the apparatus), for example using the MAC function as a pseudorandom function (PRF) as the basis of its derivative key generation.

The apparatus may make use of the received key and the received certificate chain in a large variety of ways. In some embodiments the apparatus further comprises data item authenticating circuitry to generate a data item check value for a data item in dependence on the data item and the derivative key. The data item check value can then be provided to a further device with the certificate chain, which can then verify that the apparatus is a legitimate authorization delegate (assuming that the further device itself holds the trusted root key). The apparatus may have received the data item from the further device, or may create the data item itself, in a range of possible authentication protocols.

In some embodiments the apparatus further comprises data item encryption circuitry to encrypt a data item in dependence on the data item and the derivative key. The encrypted data item can then be freely transmitted, together with the certificate chain, and only a trusted device which holds the trusted root key can decrypt the encrypted data item. Hence in some embodiments, the apparatus further comprises encrypted data transmission circuitry to transmit an encrypted data item encrypted by the data item encryption circuitry and the extended certificate chain to a recipient which holds a secret anchor key shared amongst multiple apparatuses.

Where the certificate chain provides a verifiable link between the trusted root authority and a delegate device, an apparatus in the system can use the combination of a certificate chain associated with that delegate device and the secret (shared) anchor key to extract a key corresponding to the delegate device. Accordingly in some embodiments the apparatus further comprises: key extraction circuitry to compute an extracted key in dependence on a secret anchor key and an encryption certificate chain, wherein computing the extracted key comprises an iterative process of multiple iterations, wherein each iteration comprises: extracting a certificate for the iteration from the encryption certificate chain; extracting an iteration delegation information block and an iteration authenticity check value from the certificate for the iteration; causing the authentication code generation circuitry to generate an iteration verification authenticity check value for the iteration delegation information block in dependence on the iteration delegation information block and an iteration key; verifying that the iteration verification authenticity check value matches the iteration authenticity check value; and causing the key derivation circuitry to generate a next key in dependence on the iteration delegation information block and the iteration key, wherein in a first iteration of the iterative process the iteration key is the secret anchor key and wherein in a last iteration of the iterative process the next key is the extracted key.

The extracted key may then be made use of in a variety of ways. For example in some embodiments the apparatus may have received a data item and an associated check value and can then make use of the extracted key to verify the authenticity of that data item/check value pair. Accordingly in some embodiments the apparatus further comprises: authenticity verification circuitry to perform authenticity verification for a received check value associated with a received data item and a received certificate chain, wherein the authenticity verification comprises: causing the key extraction circuitry to compute the extracted key, wherein the received certificate chain is the encryption certificate chain; and verifying that a verification check value generated by the authentication code generation circuitry in dependence on the received data item and the extracted key matches the received check value.

Alternatively or in addition, the apparatus can make use of the extracted key in order to encrypt a data item. Accordingly in some embodiments the apparatus further comprises: data item encryption circuitry to perform encryption of a data item in dependence on the data item and the extracted key, wherein encryption of the data item comprises: causing the key extraction circuitry to compute the extracted key in dependence on the secret anchor key and an encryption certificate chain.

Encrypted data items may also be decrypted using the extracted key and accordingly in some embodiments the apparatus further comprises: data item decryption circuitry to perform decryption of an encrypted data item in dependence on the encrypted data item and the extracted key, wherein decryption of the encrypted data item comprises: causing the key extraction circuitry to compute the extracted key in dependence on the secret anchor key and an encryption certificate chain.

A further feature of the present techniques proposed herein is that not only may authorization (in a general sense) be securely delegated down the serial chain from the trusted root authority, but also that a finer granularity of permissions (i.e. a set of permissions) may be propagated down the serial chain and wherein handling of the set of permissions by each delegate is constrained such that the extent of those permissions may at most stay the same (but may reduce) at each delegation step. In support of this in some embodiments the apparatus further comprises: permission setting circuitry to define a local permission mask, wherein each iteration of the iterative process of multiple iterations comprises extracting an iteration permission mask from the iteration delegation information block, and the permission setting circuitry is arranged to generate the local permission mask using a logical conjunction of the iteration permission masks extracted in the multiple iterations of the iterative process. Thus, where the permissions are defined by a permission mask, and where the local permission masks of each delegate are combined by logical conjunction, this means that a given delegate in the serial chain can only have a certain permission (corresponding to a certain bit of the permission mask), if that permission was present for each preceding delegate in the serial chain. If a delegator delegates authorization to a delegate, but restricts the corresponding permissions, the delegate can itself only operate within the scope of those delegated permissions and furthermore can only delegate authorization further within the scope (or narrower) of those delegated permissions. It will be understood that the definition of permissions in a permission mask may be implemented by the setting of bits in the permissions mask, where according to usual convention a "set" bit is 1 and an "unset" bit is 0, though of course this may be trivially inverted.

The delegate may request a particular set of permissions from a delegator, and it can be ensured that the requested set of permissions does not exceed the delegation authorization of the delegator, by the use of a logical conjunction of a local permission mask and a requested delegation mask. Any permissions requested by the delegate for which the delegator does not itself have permission, are thus simply nullified. Accordingly in some embodiments the permission setting circuitry is arranged to define a delegated permission mask using a logical conjunction of the local permission mask and a requested delegation mask, and wherein the certificate concatenation circuitry is arranged to generate the extended certificate chain comprising the encryption certificate chain appended with the local certificate, wherein the delegation information block in the local certificate comprises the delegated permission mask.

The authentication code generation circuitry is arranged to generate the authenticity check value in dependence on the delegation information block and the received key, whilst the key derivation circuitry is arranged to generate the derivative key in dependence on the delegation information block and the received key. Indeed as mentioned above, the authentication code generation circuitry and the key derivation circuitry may both employ the same function as the base of the operations. Nevertheless in order to further enhance the security of the system provided variants of the received key may be generated for different purposes within the apparatus. Accordingly in some embodiments the apparatus further comprises: purposive key generation circuitry to generate at least one further key in dependence on the received key, such that the apparatus has multiple keys comprising the received key and the at least one further key, and wherein the authentication code generation circuitry and the key derivation circuitry are arranged to use different keys of the multiple keys.

In one example embodiment described herein there is a system for authorization delegation comprising: multiple delegation entities, wherein each delegation entity of the multiple delegation entities comprises: authorization delegation circuitry to generate a derivative key in dependence on a received key, wherein the authorization delegation circuitry comprises: authentication code generation circuitry to generate an authenticity check value for a delegation information block in dependence on the delegation information block and the received key; and key derivation circuitry to generate the derivative key in dependence on the delegation information block and the received key; and certificate concatenation circuitry to generate an extended certificate chain, wherein the extended certificate chain comprises a received certificate chain appended with a local certificate, wherein the local certificate comprises the delegation information block and the authenticity check value, wherein the multiple delegation entities are arranged in a serial chain, such that the derivative key and the extended certificate chain of an earlier delegation entity in the serial chain are the received key and the received certificate chain of a subsequent delegation entity in the serial chain.

In accordance with one example configuration there is provided a system for authorization delegation comprising: multiple delegation entities, wherein each delegation entity of the multiple delegation entities comprises: authorization delegation circuitry to generate a derivative key in dependence on a received key, wherein the authorization delegation circuitry comprises: authentication code generation circuitry to generate an authenticity check value for a delegation information block in dependence on the delegation information block and the received key; and key derivation circuitry to generate the derivative key in dependence on the delegation information block and the received key; and certificate concatenation circuitry to generate an extended certificate chain, wherein the extended certificate chain comprises a received certificate chain appended with a local certificate, wherein the local certificate comprises the delegation information block and the authenticity check value, wherein the multiple delegation entities are arranged in a serial chain, such that the derivative key and the extended certificate chain of an earlier delegation entity in the serial chain are the received key and the received certificate chain of a subsequent delegation entity in the serial chain. Accordingly a serial chain of delegation entities is provided, supporting secure authorization delegation down the serial chain.

The security of the authorization may be based on a single secret anchor key which is shared amongst each device in the chain and accordingly in some embodiments a first delegation entity in the serial chain is arranged to use a secret anchor key shared amongst the multiple delegation entities as the received key.

A secure authorization chain is therefore provided between a trusted root authority at the head of the serial chain and a last delegation entity in the serial chain. This last delegation entity may make use of the authorization provided to it from the trusted root authority in a variety of ways but in some embodiments, a last delegation entity in the serial chain is arranged to use the derivative key the extended certificate chain to authenticate access to a target device, wherein the access to the target device comprises at least one of: provision of data from the last delegation entity to the target device; and extraction of data from the target device to the last delegation entity. Thus the trusted root authority can therefore control access to the target device, even when the authorization for this access is transmitted via multiple delegation entities along the serial chain.

The access to the target device may take a wide variety of forms, and may, generally, involve the provision of data to the target device from the last delegation entity and/or the provision of data from the target device to the last delegation entity. This arrangement of delegated access authorization and the transfer of data between the target device and the last delegation entity may be usefully employed in a wide variety of contexts. However in some example embodiments the last delegation entity is at least one of: a debugging device to perform debugging of the target device; a secure boot control to control a secure boot process of the target device; a firmware updater to control a firmware update process for the target device; a data provider to provide the target device with data; and a data requester to retrieve data from the target device.

The key and certificate chain received by a given delegation entity in the serial chain may have already been provided to that delegation entity before it is required for an authentication purpose. However it may also be the case that a given delegation entity determines that it does not have the key/chain which it requires to perform a certain authentication task, and in this situation a variety of mechanisms may be provided such that the delegation entity can request the required key.

In some embodiments, in which the system comprises a root trust authority, each delegation entity is arranged to solicit the received key and the received certificate chain from the root trust authority. Although the serial chain represents a link between the root trust authority and each delegation entity, it is not necessary for a request for a key and a certificate chain to be transmitted from a delegation entity to the root trust authority via the serial chain. Accordingly in some embodiments each delegation entity is arranged to solicit the received key and the received certificate chain from the root trust authority without using the serial chain. Nevertheless in other embodiments each delegation entity is arranged to request the received key and the received certificate chain from the root trust authority via the serial chain and is arranged to receive the received key and the received certificate chain via the serial chain.

Delegation entities in the serial chain and other entities which verify the authorization delegated to the delegation entities may, in some embodiments, all share a single secret anchor key. However in other embodiments the system comprises multiple verification entities, and a first delegation entity in the serial chain is arranged to use a secret anchor key specific to a target verification entity of the multiple verification entities as the received key.

In such embodiments it may be required for each of the delegation entities to be able to authenticate themselves to more than one verification entity. Accordingly some embodiments provide the system for authorization delegation, wherein each delegation entity of the multiple delegation entities comprises verification entity specific storage, wherein the verification entity specific storage comprises multiple entries, wherein each entry of the multiple entries is arranged to store: a verifier-specific received certificate chain and a verifier-specific received key. Thus depending on the verification entity (verifier) with respect to which a delegation entity must authenticate itself, the delegation entity can then make use of the appropriate verifier-specific certificate chain and verifier-specific key stored in its database.

The present techniques further recognise that the storage of multiple verifier-specific certificate chains can involve a redundancy of information storage, since although each verifier-specific certificate chain is based on a secret anchor key specific to a target verification entity, the information in the remainder of the certificate chain will be the same verifier-specific certificate chain leading via the same serial chain path from the trusted root authority to the delegate entity. Accordingly, instead of storing each verifier-specific certificate chain, a delegate entity may only retain the full set of information from a first verifier-specific certificate chain, and the subsequent verifier-specific certificate chains the redundant (duplicated) information need not be stored. Accordingly in some embodiments in the system for authorization delegation each delegation entity of the multiple delegation entities comprises verification entity specific storage, wherein the verification entity specific storage comprises multiple entries, wherein each entry of the multiple entries is arranged to store: a verifier-specific set of delegation information blocks, a verifier-specific set of authenticity check values, and a verifier-specific received key.

In such embodiments in which verifier-specific authorization is delegated down the serial chain, this delegation may further be combined with the imposition of policy rules (potentially specific to each delegation entity) regarding what access permissions are comprised within the verifier-specific authorization which is delegated. Accordingly in some embodiments, in the system for authorization delegation, the earlier delegation entity in the serial chain is arranged to provide the subsequent delegation entity in the serial chain with: a verifier-specific extended certificate chain comprising the verifier-specific received certificate chain appended with the local certificate; and a verifier-specific derivative key generated by the key derivation circuitry in dependence on the delegation information block and the verifier-specific received key, in dependence on local policy data defining access permission for access by the subsequent delegation entity to the target verification entity. This verifier-specific authorization delegation may also be combined with the above described technique for permissions limitation, such that the verifier-specific authorization comprises permissions, which can at most be maintained, but may be further limited, with each delegation step.

In another approach to the provision of a mechanism for a delegate to request permission to access a given verification entity (verifier), the present techniques propose a further variant in which an asymmetric key pair (i.e. a private key and an associated public key) are used by the delegate in order to authenticate itself to its delegator in the serial chain, as part of a request for access permission to that given verification entity. Thus in some embodiments of the system for authorization delegation, the earlier delegation entity in the serial chain and the subsequent delegation entity in the serial chain are arranged to perform an authorization delegation process which comprises: the subsequent delegation entity having a public key paired with a private key and sending the public key to the earlier delegation entity; the earlier delegation entity providing the subsequent delegation entity with a signed delegation information block; the subsequent delegation entity sending the signed certificate and a request to the earlier delegation entity for access to the target verification entity, wherein the request is signed using the subsequent delegation entity's private key; the earlier delegation entity verifying the signed certificate and the signed request; the earlier delegation entity verifying that local permission data allows the subsequent delegation entity to access the target verification entity; the earlier delegation entity generating an authenticity check value specific to the target verification entity in dependence on the certificate unique to the subsequent delegation entity and a received key specific to the target verification entity; the earlier delegation entity generating a derivative key specific to the target verification entity in dependence on the certificate unique to the subsequent delegation entity and the received key specific to the target verification entity; and the earlier delegation entity sending the derivative key specific to the target verification entity, the authenticity check value specific to the target verification entity, and the received certificate chain.

In one example embodiment described herein there is a method for authorization delegation comprising: receiving a received key; receiving a received certificate chain; generating an authenticity check value for a delegation information block in dependence on the delegation information block and the received key; generating a derivative key in dependence on the delegation information block and the received key; and generating an extended certificate chain, wherein the extended certificate chain comprises the received certificate chain appended with a local certificate, wherein the local certificate comprises the delegation information block and the authenticity check value.

Particular embodiments will now be described with reference to the figures.

FIG. 1 illustrates an apparatus 100 in accordance with an example embodiment. The apparatus comprises authentication code generation circuitry 102, key derivation circuitry 104, and certificate concatenation circuitry 106. The apparatus 100 is arranged to receive a key $k_{n-1}$ from a preceding apparatus in a serial chain of such apparatuses. The key $k_{n-1}$ is a first input to the authentication code generation circuitry 102 and is also a first input to the key derivation circuitry 104. The apparatus 100 has a delegation information block 108 and this provides a second input to each of the authentication code generation circuitry 102 and the key derivation circuitry 104. On the basis of the key $k_{n-1}$ and the delegation information block 108 the authentication code generation circuitry 102 generates a check value 110. Also on the basis of the key $k_{n-1}$ and the delegation information block 108 the derivation circuitry 104 generates a derivative key $k_n$. Together the delegation information block 108 and the check value 110 form a local certificate 112. The apparatus 100 also receives a certificate chain 114 and has certificate concatenation circuitry 106, which appends the local certificate 112 to the received certificate chain 114 to generate an extended certificate chain 116. The derivative key $k_n$ and the extended certificate chain 116 form the output of the apparatus 100. More specifically this $n^{th}$ apparatus in a serial chain of such apparatuses provides the derivative key $k_n$ and the extended certificate chain 116 to a next $(n+1^{th})$ apparatus in the serial chain.

Figure 2:
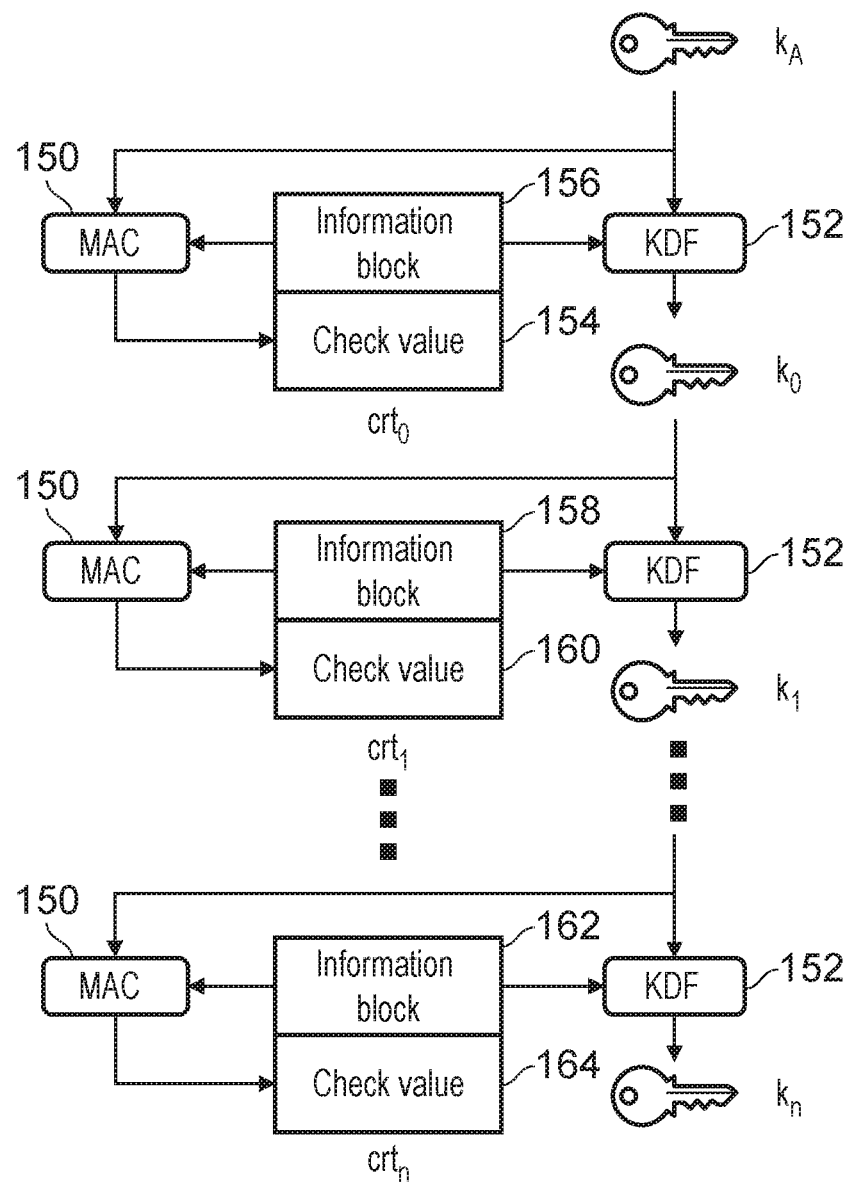
FIG. 2 schematically illustrates a serial chain of certificate and key generation, starting with a trusted root key $k_A$ in accordance with some embodiments.

FIG. 2 schematically illustrates a serial chain of certificate and key generation, such as is supported by the serial chain of apparatuses referred to above with respect to FIG. 1. The origin of the serial chain is a trusted root authority, which holds the anchor key $k_A$ for the trust infrastructure. The trusted root authority, like each delegate apparatus in the serial chain, comprises authentication code generation circuitry 150 and key derivation circuitry 152. Using the anchor key $k_A$ the trusted root authority generates a check value 154 for a delegation information block 156, where the authentication code generation circuitry 150 is embodied here as carrying out a message authentication code (MAC) function. The trusted root authority also generates (by means of the key derivation function (KDF) supported by its key derivation circuitry 152) the derivative key $k_0$ using the anchor key $k_A$ and the delegation information block 156. Together the delegation information block 156 and the check value 154 provide the certificate $crt_0$. The derivative key $k_0$ and the certificate $crt_0$ are provided to the first delegate apparatus in the serial chain. The first delegate apparatus uses the same MAC function 150 to generate a check value 160 for its delegation information block 158 and uses the same KDF 152 to generate its derivative key $k_1$. This process continues, being carried out by each delegate apparatus in the serial chain, until the last delegate apparatus in the serial chain is reached which uses the same MAC function 150 to generate a check value 164 for its delegation information block 162 and uses the same KDF 152 to generate its derivative key $k_n$.

Figure 3:
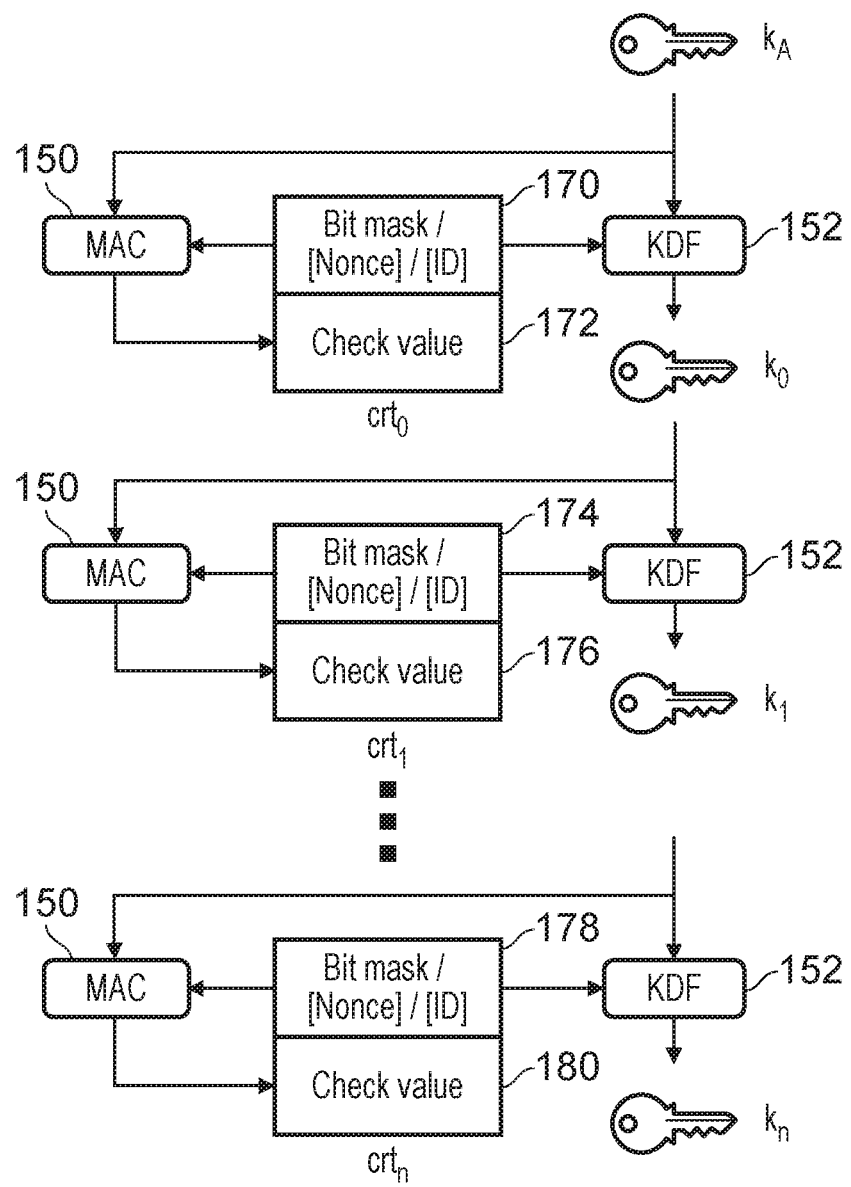
FIG. 3 schematically illustrates a serial chain of certificate and key generation, starting with a trusted root key $k_A$ in accordance with some embodiments.

FIG. 3 schematically illustrates a serial chain of certificate and key generation, starting with a trusted root key $k_A$ in a more specific example of the arrangement shown in FIG. 2. The data represented by the delegation information block at each stage of the serial delegation chain may take a wide variety of forms, depending on what information is required to be reliably (verifiably) transmitted along the chain. In the example of FIG. 3 each delegation information block comprises a delegation bit mask and may optionally additionally comprise a nonce and/or an ID value indicative of the intended target for the bit mask. The nonce may for example be provided by random number generation or by a monotonically increasing counter. Hence the trusted root authority MACs the first delegation information block 170 (comprising at least a delegation bit mask defined by the trusted root authority) using the anchor key $k_A$ to generate a check value 172 and uses the delegation information block 170 as an input to its KDF to derive the derivative key $k_0$ from the anchor key $k_A$. The resulting certificate $crt_0$ and the derivative key $k_0$ are provided to the first delegate apparatus in the serial chain. The first delegate apparatus MACs its own delegation information block 174 (comprising at least a locally defined delegation bit mask) using the derivative key $k_0$ to generate the check value 176 and uses its delegation information block 174 as an input to its KDF to derive the derivative key $k_1$ from $k_0$. The resulting certificate $crt_1$ and the derivative key $k_1$ are provided to the next delegate apparatus in the serial chain. This process continues, being carried out by each delegate apparatus in the serial chain, and in particular with each delegate apparatus using its own locally defined delegation bit mask, until the last delegate apparatus in the serial chain is reached, which MACs its own delegation information block 178 to generate the check value 180 and uses its delegation information block 178 as an input to its KDF to derive the derivative key $k_n$ from $k_{n-1}$. The resulting certificate $crt_n$ and the derivative key $k_n$ may then be used for a variety of purposes as will be described with reference to the figures which follow.

Figure 4:
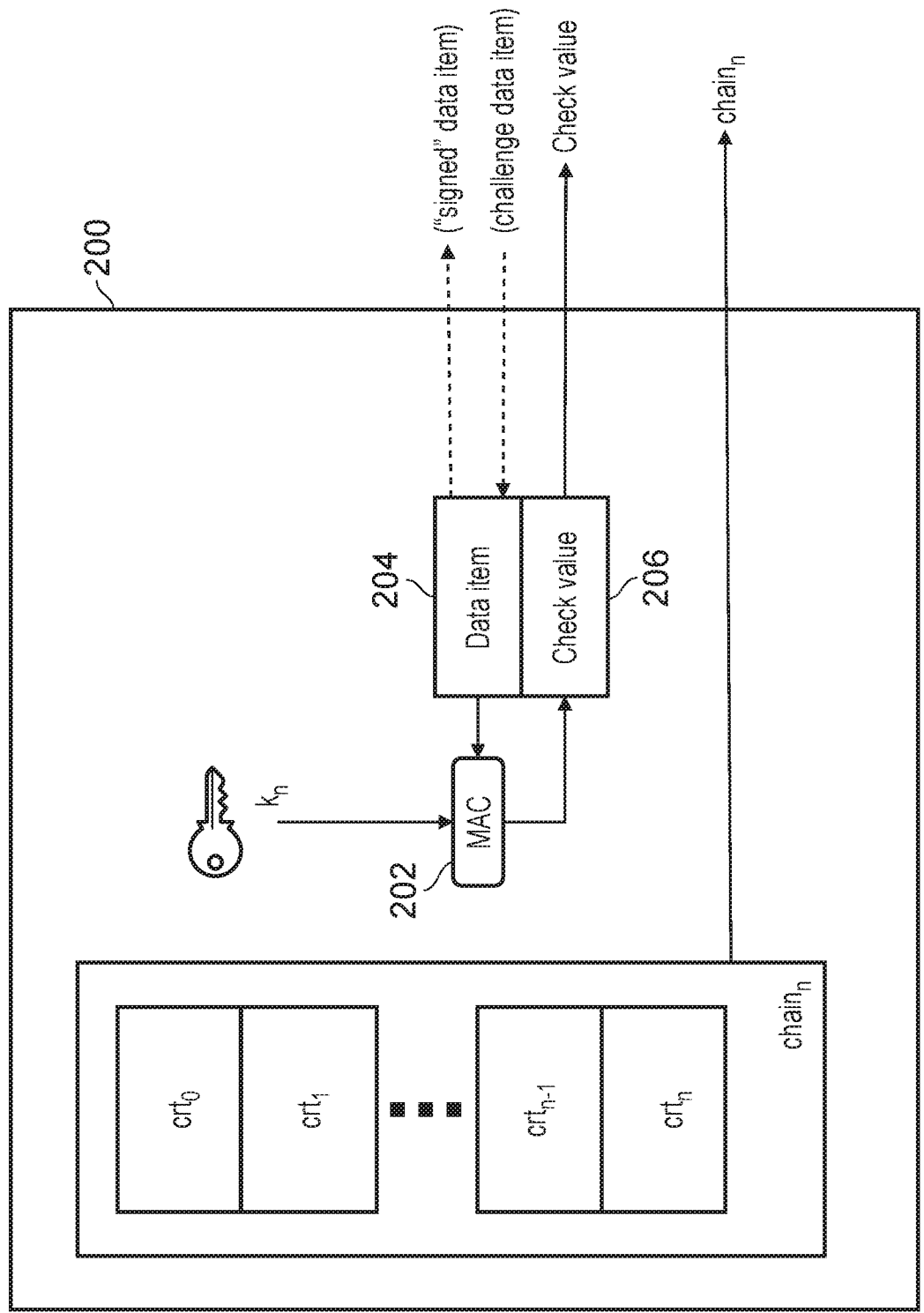
FIG. 4 schematically illustrates an $n^{th}$ apparatus in a serial chain using a corresponding $n^{th}$ key and a chain of certificates to generate a check value for a data item in accordance with some embodiments.

FIG. 4 schematically illustrates a number of ways in which an apparatus 200 holding a key $k_n$ and a chain of certificates $chain_n$ may make use of them. MAC circuitry 202 in the apparatus 200 can use the key $k_n$ to MAC a data item 204 to generate a corresponding check value 206. The data item 204 may be a document originating in the apparatus 200 which is to be verified (to protect the integrity of the document and/or to authenticate the entity generating the check value, i.e. "signing" the data item). Alternatively the data item 204 may have been provided to the apparatus 200 as a challenge in an authentication protocol. The apparatus 200 thus provides $chain_n$ and the check value 206, and these may be used by another entity in the trust infrastructure to confirm the authenticity of the apparatus 200.

Figure 5:
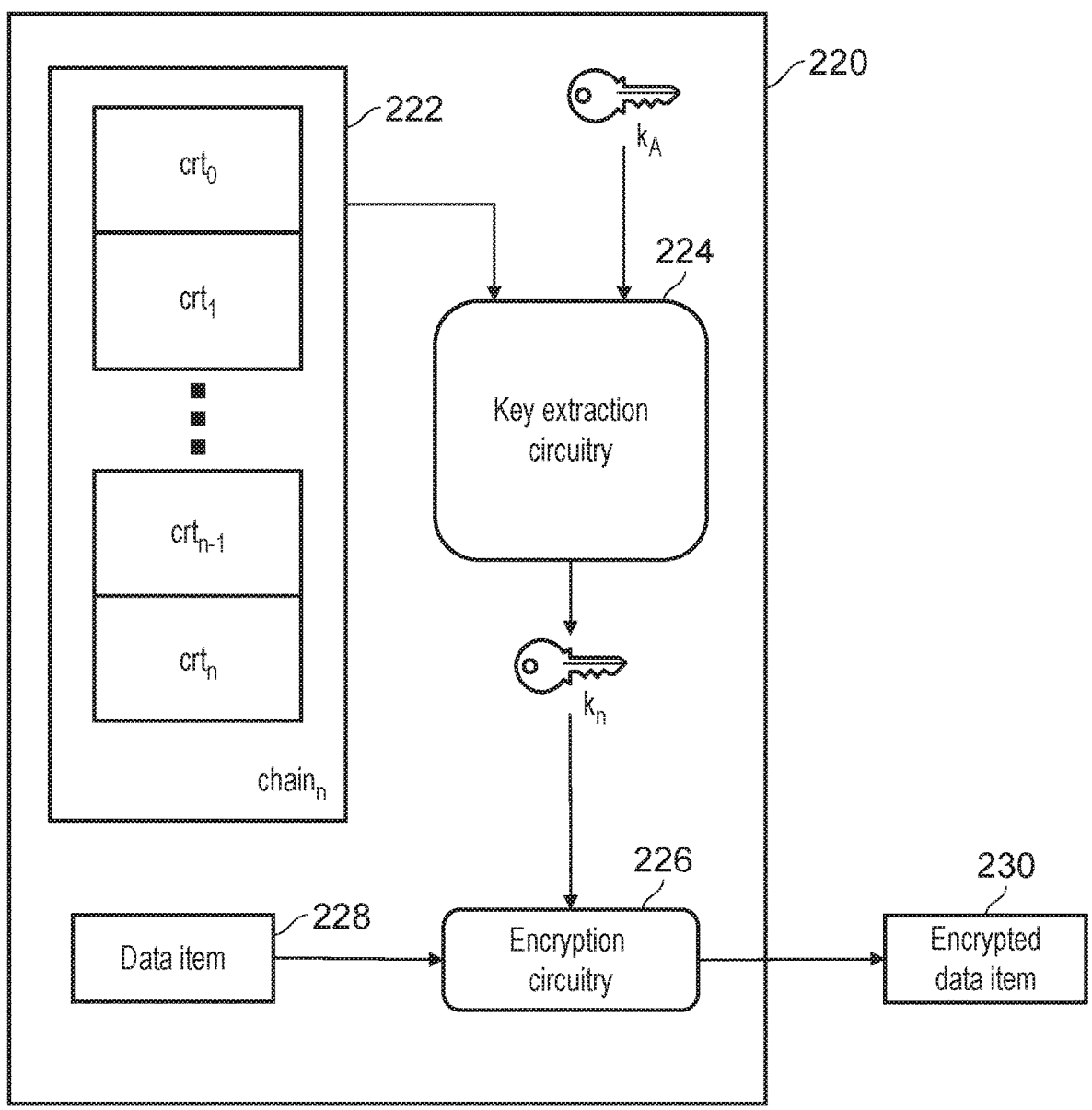
FIG. 5 schematically illustrates an $n^{th}$ apparatus in a serial chain using a copy of a trusted root key and a chain of certificates to derive the $n^{th}$ key, which is then used to encrypt a data item in accordance with some embodiments.

FIG. 5 schematically illustrates an apparatus 220 which holds the root key $k_A$ and the chain of certificates $chain_n$ using them to derive the key $k_n$, which is then used to encrypt a data item. The root key $k_A$ and the chain of certificates $chain_n$ 222 provide the inputs to key derivation circuitry 224, which derives the key $k_n$. The process followed to extract the key $k_n$ is described below in more detail with reference to FIG. 6. Then, the apparatus 220 uses the key $k_n$ in its encryption circuitry 226 to encrypt a data item 228 and the resulting encrypted data item 230 can then be output.

Figure 6:
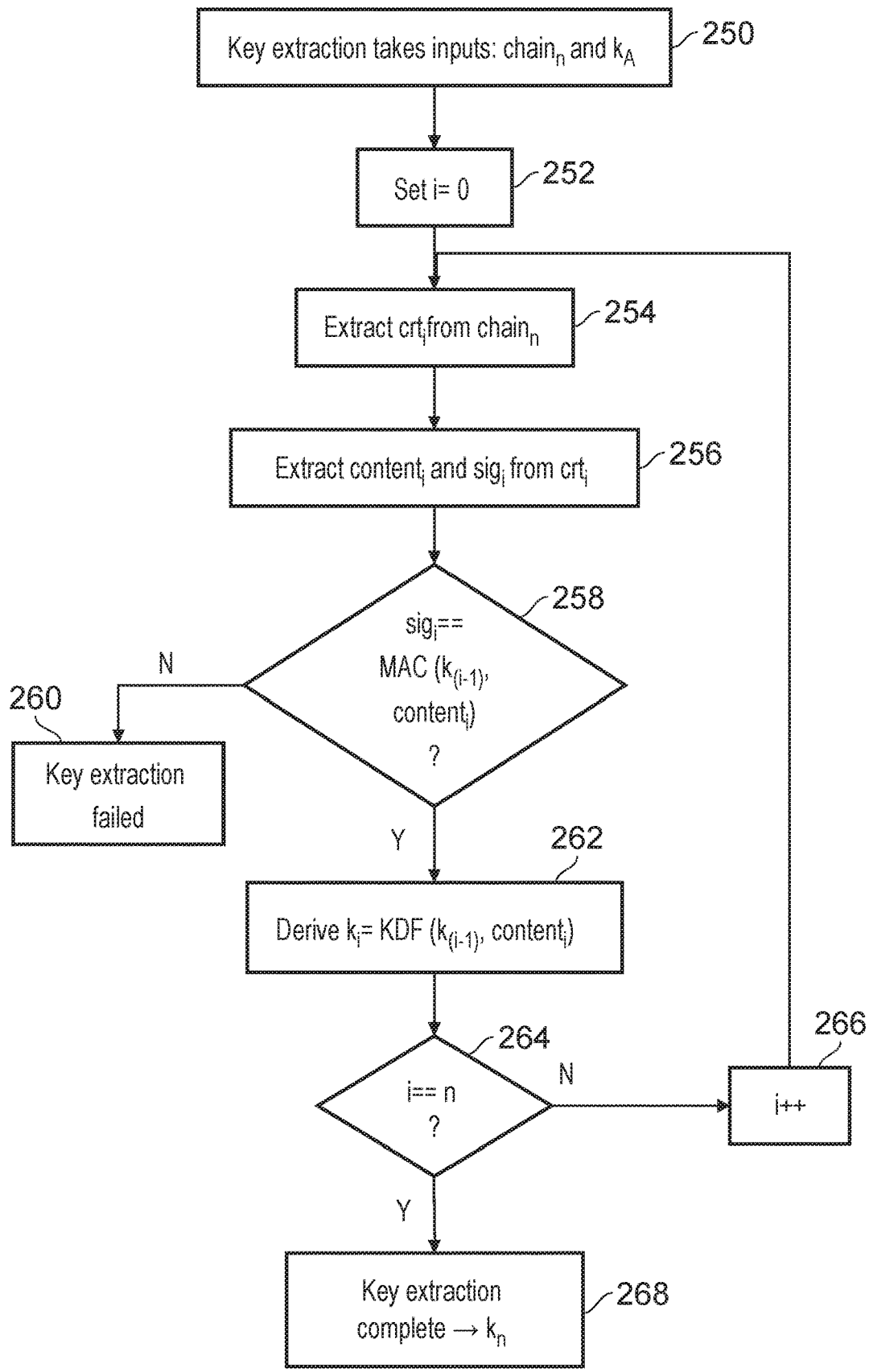
FIG. 6 is a flow diagram showing a sequence of steps which are taken in the method of some embodiments in order to extract an $n^{th}$ key using a trusted root key and a chain of certificates.

FIG. 6 is a flow diagram showing a sequence of steps which are taken in the method of some embodiments in order to extract an $n^{th}$ key $k_n$ using a trusted root key $k_A$ and a chain of certificates $chain_n$, such as is carried out by the key extraction circuitry 224 in FIG. 5. The key extraction (at step 250) takes as its inputs $chain_n$ and $k_A$. An iteration variable i is set to 0 at step 252. Then at step 254 certificate $crt_i$ is extracted from $chain_n$. At step 256 content, and $sig_i$ are extracted from $crt_i$. Here the variables content, and $sig_i$ are used to refer to the delegation information block and its associated check value at a given iteration stage (i.e. delegation stage in the serial chain). It is then verified at step 258 that $sig_i$ is equal to $MAC(k_{i-1}, content_i)$, where it will be understood that in the first iteration of this process (when i is 0) $k_{i-1}$ means $k_A$. If this verification fails then the flow ends at step 260 and the key extraction has failed, because the authenticity of the serial chain could not be confirmed. However if the verification at step 258 succeeds, then the flow proceeds to step 262, at which the derivative key k_i is generated using the KDF on $k_{i-1}$ and $content_i$. Again it will be understood that in the first iteration of this process (when i is 0) $k_{i-1}$ means $k_A$. It is checked at step 264 if i has reached n. If it has not, i is incremented at step 266 and the flow returns to step 254 for the next iteration to be carried out. Once i reaches n then the flow concludes at step 268, since the key $k_n$ has now been extracted.

Figure 7:
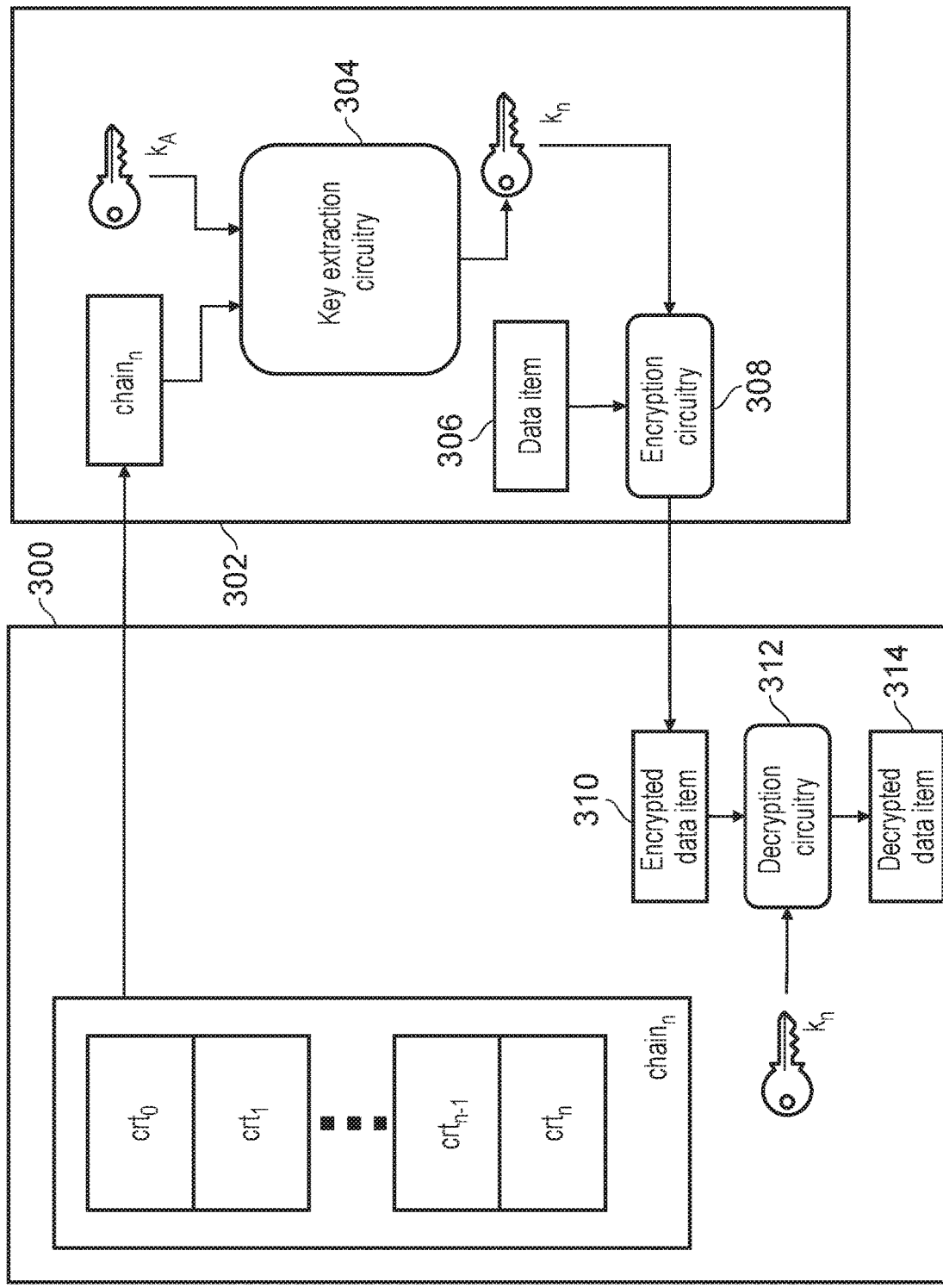
FIG. 7 schematically illustrates a first apparatus holding an $n^{th}$ key sending a chain of certificates to a second apparatus which holds the trusted root key and uses these to derive the $n^{th}$ key, which is then used to encrypt a data item which is sent back to the first apparatus, which is able to decrypt the encrypted data item using its copy of the $n^{th}$ key in accordance with some embodiments.

FIG. 7 schematically illustrates a first apparatus 300 which holds certificate chain $chain_n$ and a corresponding an $n^{th}$ derivative key $k_n$. The apparatus 300 is in communication with a second apparatus 302, which holds a copy of the anchor key $k_A$. The apparatus 300 sends chain$_n$ to the apparatus 302, which comprises key extraction circuitry 304. The key extraction circuitry 304 performs the key extraction process as described above with reference to FIG. 6. Thus, taking chain$_n$ and $k_A$ as inputs, it derives the $n^{th}$ derivative key $k_n$. The apparatus 302 then uses $k_n$ to encrypt a data item 306 (using its encryption circuitry 308) and produce an encrypted data item 310, which is sent back to the first apparatus 300. Being in possession of $k_n$ the apparatus 300 can decrypt the encrypted data item 310 (using its decryption circuitry 312) to produce the decrypted data item 314 (which is identical to the data item 306).

Figure 8:
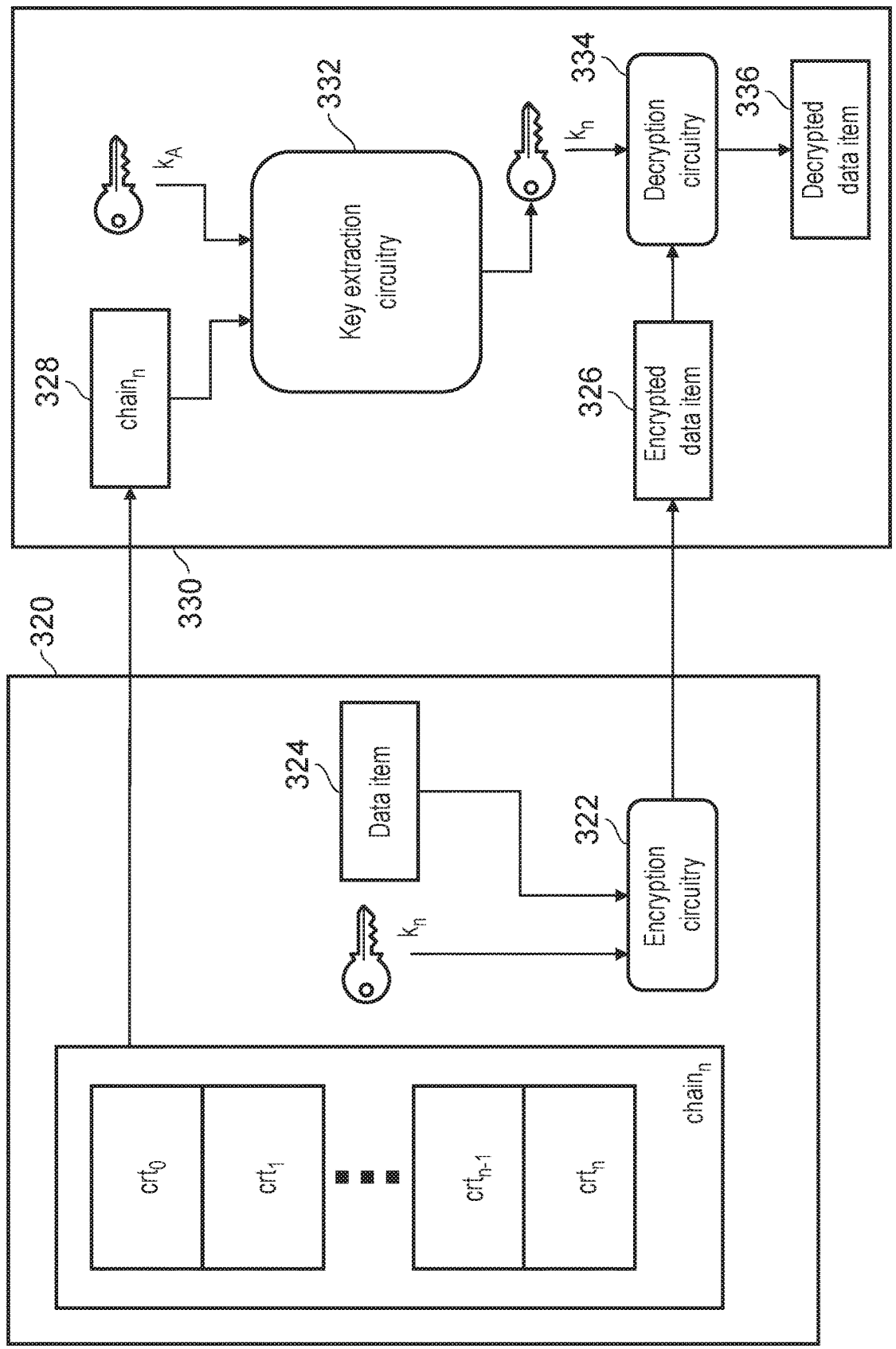
FIG. 8 schematically illustrates a first apparatus holding an $n^{th}$ key, which it uses to encrypt a data item and send the encrypted data item to a second apparatus together with a chain of certificates, and the second apparatus uses its copy of the trusted root key to derive the $n^{th}$ key from the chain of certificates and decrypt the encrypted data item in accordance with some embodiments.

FIG. 8 schematically illustrates an example use arrangement comprising a first apparatus 320 (which holds certificate chain chain$_n$ and a corresponding an $n^{th}$ derivative key $k_n$) and a second apparatus 330, which holds a copy of the anchor key $k_A$. The apparatus 320 uses $k_n$ to encrypt a data item 324 (using its encryption circuitry 322) and produce an encrypted data item 326. The encrypted data item 326 and chain$_n$ 328 are sent to the apparatus 330. Apparatus 330, comprises key extraction circuitry 332, which performs the key extraction process as described above with reference to FIG. 6. Thus, taking chain$_n$ and $k_A$ as inputs, it derives the $n^{th}$ derivative key $k_n$. The apparatus 330 can then decrypt the encrypted data item 326 received from apparatus 320 (using its decryption circuitry 334) to produce the decrypted data item 336 (which is identical to the data item 324).

Figure 9:
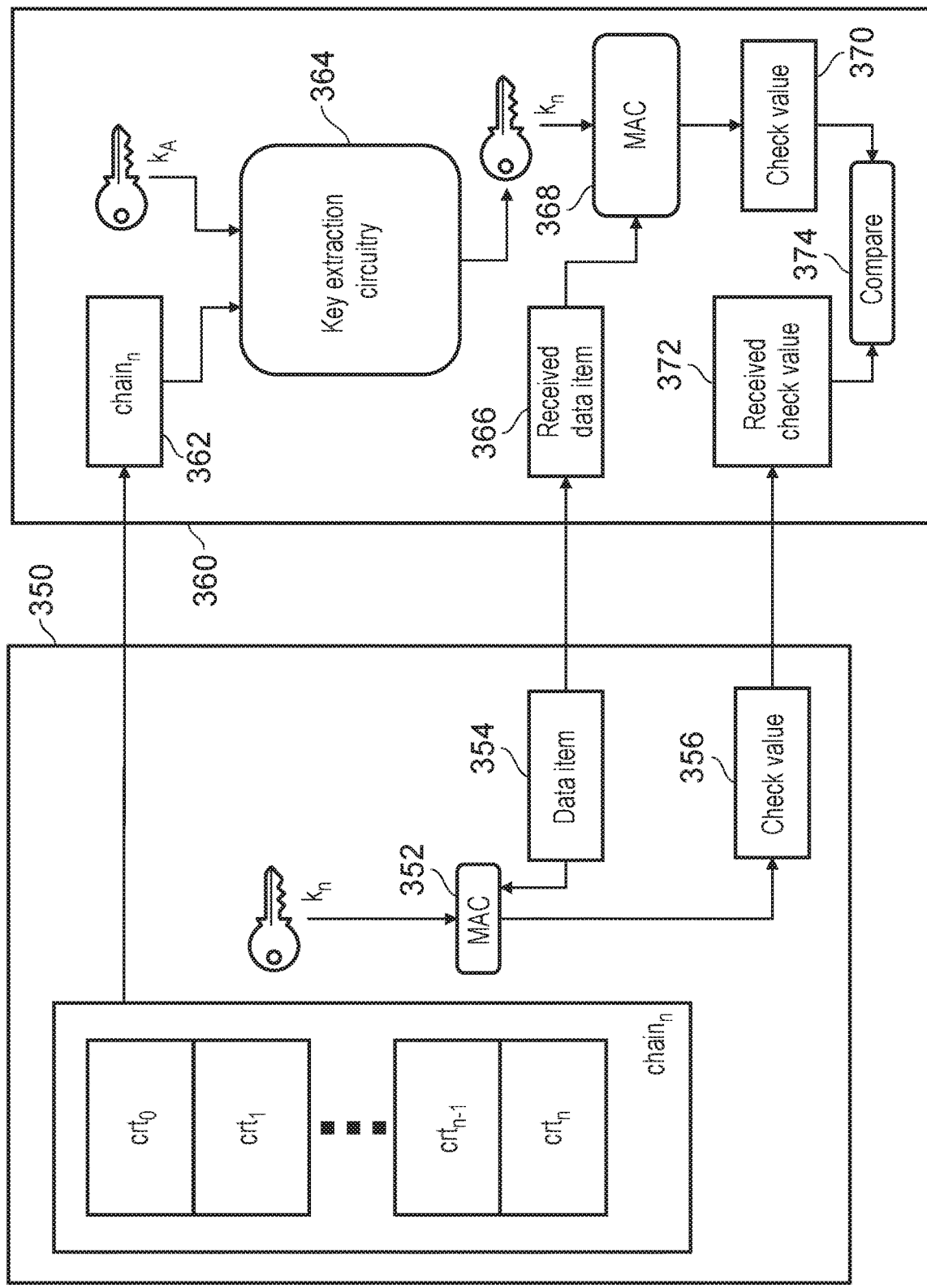
FIG. 9 schematically illustrates a first apparatus holding an $n^{th}$ key, which it uses to generate a check value for a data item, where the data item and the check value are sent to a second apparatus together with a chain of certificates, and the second apparatus, uses its copy of the trusted root key to derive the $n^{th}$ key from the chain of certificates and verify the received check value for the data item in accordance with some embodiments.

FIG. 9 schematically illustrates an example use arrangement comprising a first apparatus 350 (which holds certificate chain chain$_n$ and a corresponding an $n^{th}$ derivative key $k_n$) and a second apparatus 360, which holds a copy of the anchor key $k_A$. The apparatus 350 uses $k_n$ to generate a check value 356 for a data item 354 (using its MAC circuitry 352). The data item 354, the check value 356, and the chain$_n$ 362 are sent to the apparatus 360. Apparatus 360, comprises key extraction circuitry 364, which performs the key extraction process as described above with reference to FIG. 6. Thus, taking chain$_n$ 362 and $k_A$ as inputs, it derives the $n^{th}$ derivative key $k_n$. The apparatus 360 further comprises MAC circuitry 368, with which it can verify the received check value 372 and the received data item 366. MAC circuitry 368 uses $k_n$ to generate a verification check value 370 for the received data item 366. The received check value 372 is compared with the verification check value 370 by comparison circuitry 374. If the two are identical, then the received data item 366 is verified.

Figure 10:
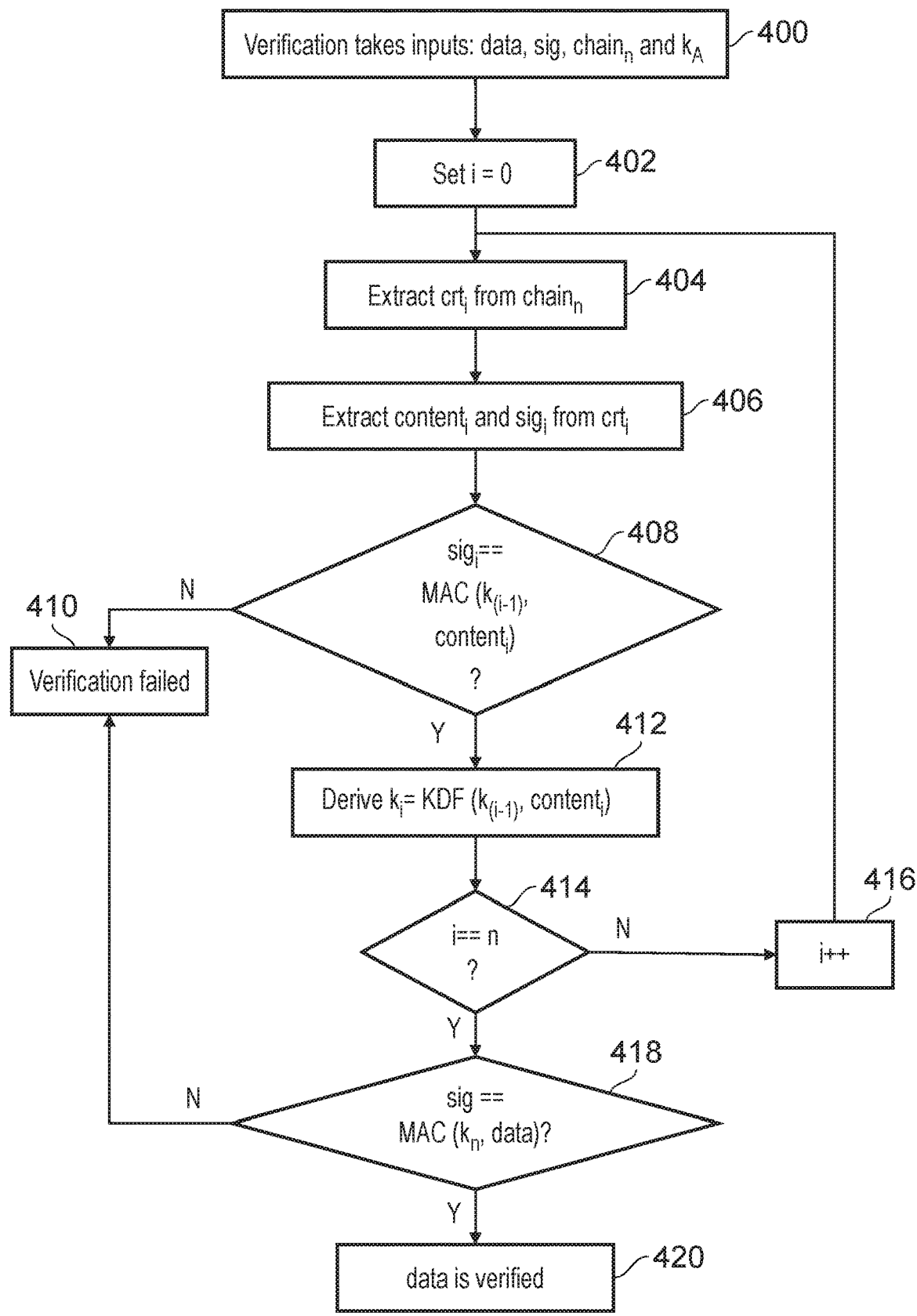
FIG. 10 is a flow diagram showing a sequence of steps which are taken in the method of some embodiments in order to verify a data item and its check value, using a trusted root key and a chain of certificates to extract an $n^{th}$ key with which the check value can be verified.

FIG. 10 is a flow diagram showing a sequence of steps which are taken in the method of some embodiments in order to verify a data item, using a check value accompanying the data item, a trusted root key $k_A$, and a chain of certificates chain$_n$. This corresponds to the verification process carried out by the apparatus 360 in FIG. 9. The verification process (at step 400) takes as its inputs the data item (data) and its check value (sig), chain$_n$, and $k_A$. An iteration variable i is set to 0 at step 402. Then at step 404 certificate crt$_i$ is extracted from chain$_n$. At step 406 content$_i$ and sig$_i$ are extracted from crt$_i$. Here the variables content$_i$ and sig$_i$ are used to refer to the delegation information block and its associated check value at a given iteration stage (i.e. delegation stage in the serial chain). It is then verified at step 408 that sig$_i$ is equal to MAC($k_{i-1}$, content$_i$), where it will be understood that in the first iteration of this process (when i is 0) $k_{i-1}$ means $k_A$. If this verification fails then the flow ends at step 410, because the authenticity of the serial chain could not be confirmed. However if the verification at step 408 succeeds, then the flow proceeds to step 412, at which the derivative key k_i is generated using the KDF on $k_{i-1}$ and content$_i$. Again it will be understood that in the first iteration of this process (when i is 0) $k_{i-1}$ means $k_A$. It is checked at step 414 whether i has reached n. If it has not, i is incremented at step 416 and the flow returns to step 404 for the next iteration to be carried out. Once i reaches n the key $k_n$ has been extracted and it is then verified at step 418 whether the received check value sig is equal to MAC($k_n$, data). If this comparison reveals a difference, then the verification fails and the flow ends at step 410. However if the two check values match, then the data item is verified and the process ends at step 420.

Figure 11:
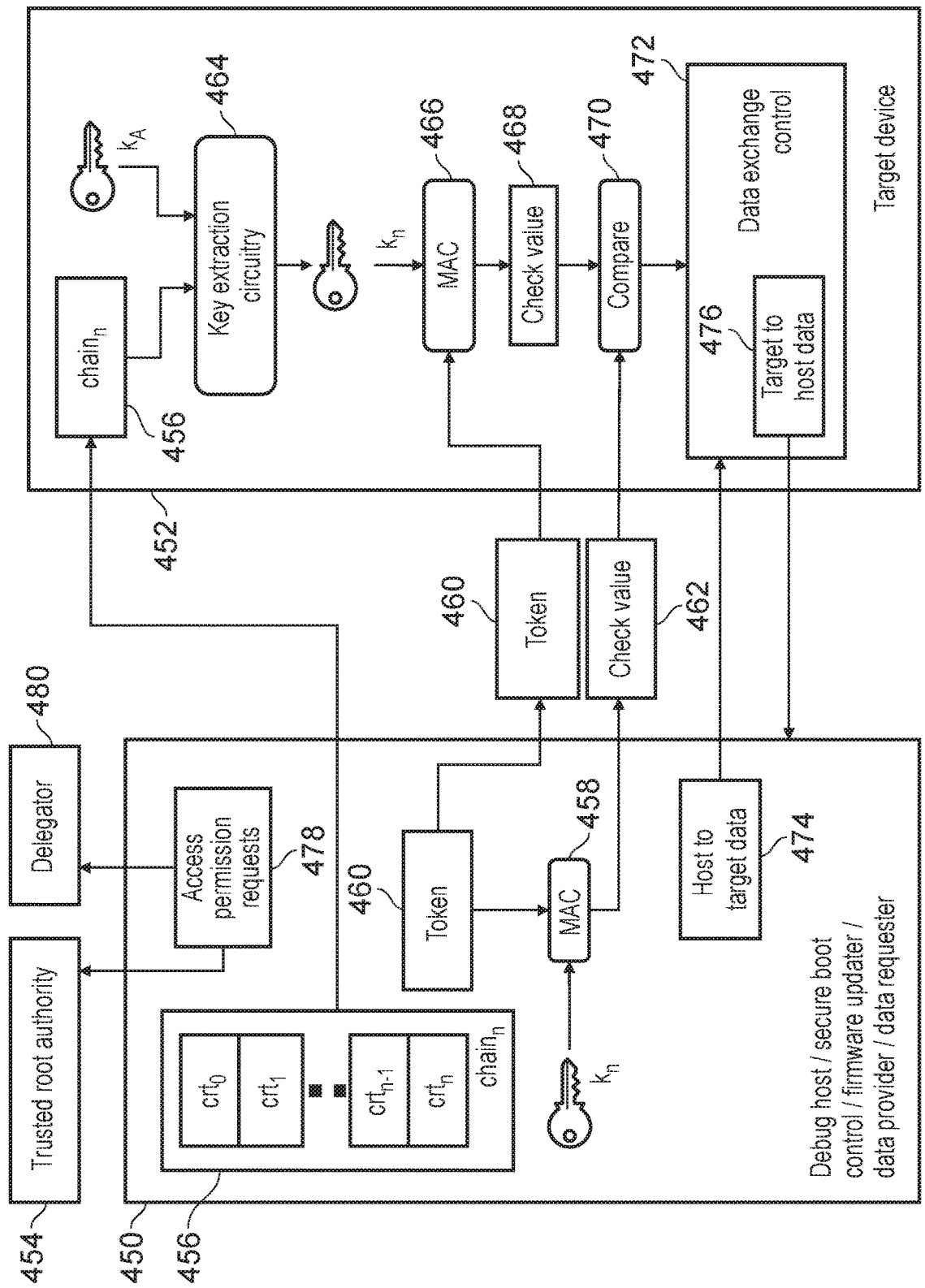
FIG. 11 schematically illustrates a first apparatus, to which authorization to access a target device has been delegated via a serial chain of delegates from a trusted root authority, using a derivative key and a certificate chain to authenticate itself to the target device so that the access can be allowed to proceed in accordance with some embodiments.

FIG. 11 schematically illustrates an arrangement comprising an apparatus 450 to which authorization to access a target device 452 has been delegated via a serial chain of delegates from a trusted root authority 454. The apparatus 450 can demonstrate that it has validly been delegated this authorization by virtue of the fact that it holds the derivative key $k_n$ and a corresponding certificate chain chain$_n$ 456. The schematic illustration of FIG. 11 shows a range of possibilities for the nature of the apparatus 450, and therefore the nature of the type(s) of access to target device 452. Examples are listed in the figure of the apparatus being a debug host, a secure boot controller, a firmware updater, and more generally any kind of data provider or data requester. Thus in the situation of the apparatus 450 being a debug host, the target device 452 is then to be subjected to a debug process under the control of the debug host 450. The arrangement shown in FIG. 11 thus shows the use of the present techniques to allow the trusted root authority to install the anchor key $k_A$ in the target device 452 and to delegate access permission via a serial chain of delegates reaching the apparatus 450, whereby the target device can verify that the apparatus has the correct access permissions correctly delegated to it. This then means that a standardized port providing access to the target device can be left open when the device 452 is manufactured (and not, say, fused off as a defensive measure against malicious use of the port). This standardized port might for example be based on the widely used JTAG (Joint Test Action Group) interface protocols, it might be based on the SWD (Serial Wire Debug) interface provided by Arm Limited, Cambridge, UK, or in fact any other kind of access interface via which the host device 450 may seek access to the target device 452. Such a debug port might be used for a great range of purposes such as: flash programming, loading code to RAM for execution, memory upload/download, provisioning of root-of-trust (RoT), device configuration, logging, extraction of data, the recovery of bricked devices, for trace purposes (both invasive and non-invasive), as well as "normal" run/stop debug during development. The present authorization delegation techniques are not limited to any particular use case. Whatever the particular use case, the apparatus 450 demonstrates to the target device 452 that it has validly been delegated the authorization to access the target by using its MAC circuitry to generate a check value 462 for a token 460, using the derivative key $k_n$. The token 460 may comprise a challenge received from target device 452. The token 460, the check value 462, and the certificate chain chain$_n$ 456 are passed from the apparatus 450 to the target device 452. In the manner of the apparatus 360 in the example of FIG. 9, the target device 452 verifies the token 460 by using chain$_n$ 456 and $k_A$ in its key extraction circuitry 464 to extract key $k_n$. The target device 452 further comprises MAC circuitry 466, with which it verifies the received token 460 and its check value 462. The MAC circuitry 466 uses $k_n$ to generate a verification check value 468 for the token 460. The received check value 462 is compared with the verification check value 468 by comparison circuitry 470. If the two are identical, this is signalled to the data exchange control circuitry 472, which can then permit host-to-target data 474 to be received by the target device 452 and/or target-to-host data 476 to be sent from the target device 452 to the host 450. It is to be noted that the present disclosure further proposes that, whilst the access permission for the host device to access the target device 452 might be binary in the sense that access is either permitted or it is not, a finer level of granularity of access permission control (and delegation) is also proposed, which can allow the host device 450 to perform some accesses and prevent the host device 450 from performing other accesses with respect to the target device 452. This is based on the use of permission bit masks, which will be described in more detail below. FIG. 11 also schematically illustrates that the apparatus 450 can be arranged to generate access permission requests, when the apparatus 450 wishes to make an access to the target device 452, for which it does not currently have the required permissions. These access permission requests 478 may be communicated to the trusted root authority 454 (either directly or via the serial delegate chain) or may be communicated to the immediate delegator 480 of the apparatus 450, i.e. to the preceding device in the serial chain of authorization delegation. The trusted root authority 454 can propagate a defined access permission to the apparatus 450 via the serial delegation chain, or the delegator 480 can directly respond to an access permission request from the apparatus 450, if the delegator 480 itself already has the authority to delegate the requested permission to the apparatus 450.

Figure 12:
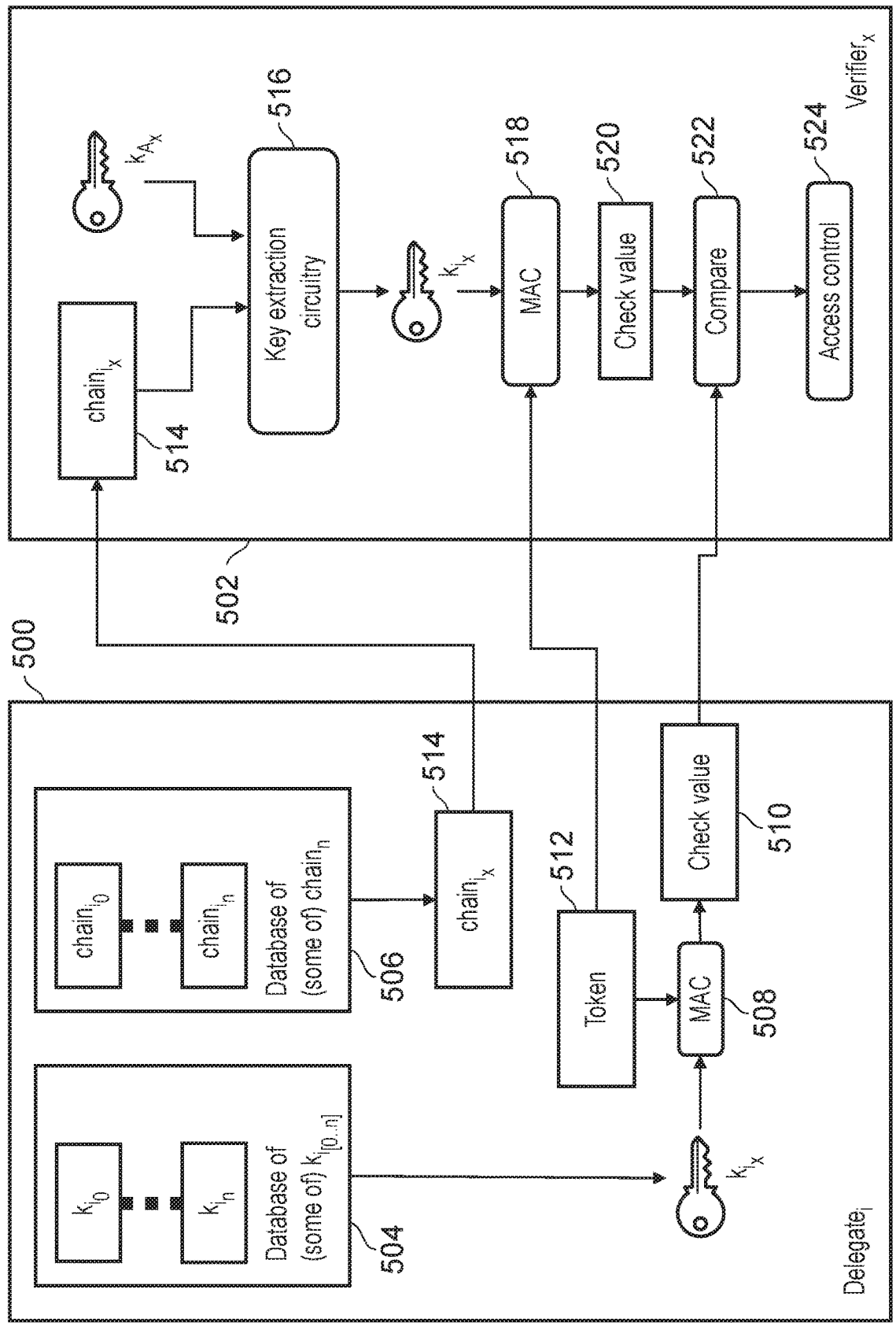
FIG. 12 schematically illustrates a delegate apparatus and a target apparatus, where a trusted root key is specific to the target apparatus, and wherein the delegate apparatus holds a database of derivative keys and certificate chains which are specific to a number of target apparatuses, and the delegate apparatus uses the derivative key and certificate chain which are specific to the illustrated target apparatus in order to authenticate itself to the target device in accordance with some embodiments.

Whilst there may be a single secret anchor key which is shared by all verifiers in the infrastructure, FIG. 12 schematically illustrates an example embodiment in which multiple secret anchor keys are used. This allows either different groups of devices to have different secret anchor keys, or indeed for each verifier to have its own secret anchor key. On the one hand this proliferation of secret anchor keys has a security benefit in that for a given number of verifies in the infrastructure the number of entities sharing a given secret anchor key is reduced. On the other hand, some further capabilities must then be supported within each delegate device which seeks access to a given verifier. The arrangement of FIG. 12 is one example of this. Here apparatus 500 represents $delegate_i$ in a chain of delegates and apparatus 502 represents a $verifier_x$ for which a secret anchor key $k_{A\_x}$ has been allocated by the root authority. Where $delegate_i$ requires access to multiple verifiers, it therefore maintains a database of derivative keys and of certificate chains which are specific the verifiers which it accesses. Thus in the example configuration of FIG. 12, the apparatus 500 comprises a database 504 of derivative keys and a database 506 of certificate chains. Note the two levels of subscript used in the notation of FIG. 12, where the database 504 holds multiple derivative keys $k_{i\_[0 \ldots n]}$ where the first level of subscript refers to the position i of the delegate, in the serial chain and the second level of subscript refers to the [0 . . . n] verifiers in the infrastructure to which $delegate_i$ can possibly have access. Note further that the databases 504 and 506 are labelled as holding sets of derivative keys and certificate chains, which may not comprise all of the complete set of derivative keys and certificate chains for all verifiers [0 . . . n]. In other words, it may be the case that delegate, has only been provided with a strict subset of the complete set of derivative keys and certificate chains for all verifiers [0 . . . n]. Nevertheless when the apparatus 500 seeks access to the apparatus 502, and the required derivative key/certificate chain pair is present in its databases, this particular derivative key/certificate chain pair is then used to authenticate that access. In the example schematically illustrated in FIG. 12, the apparatus 502 is verifier and so the apparatus 500 retrieves the derivative key $k_{i\_x}$ and the $chain_{i\_x}$, where the derivative key $k_{i\_x}$ is used by its MAC circuitry 508 to generate a check value 510 for a token 512, and the $chain_{i\_x}$ 514, the token 512, and the check value 510 are passed to the $verifier_x$ (apparatus 502) for verification. The apparatus 502 verifies the token 512 by using $chain_{i\_x}$ 514 and $k_{A\_x}$ in its key extraction circuitry 516 to extract key $k_{i\_x}$. The apparatus 502 further comprises MAC circuitry 518, with which it verifies the received token 512 and its check value 510. The MAC circuitry 518 uses $k_{i\_x}$ to generate a verification check value 520 for the token 512. The received check value 510 is compared with the verification check value 520 by comparison circuitry 522. If the two are identical, this is signalled to the access control circuitry 524, which can then permit apparatus 500 further access.

Figure 13:
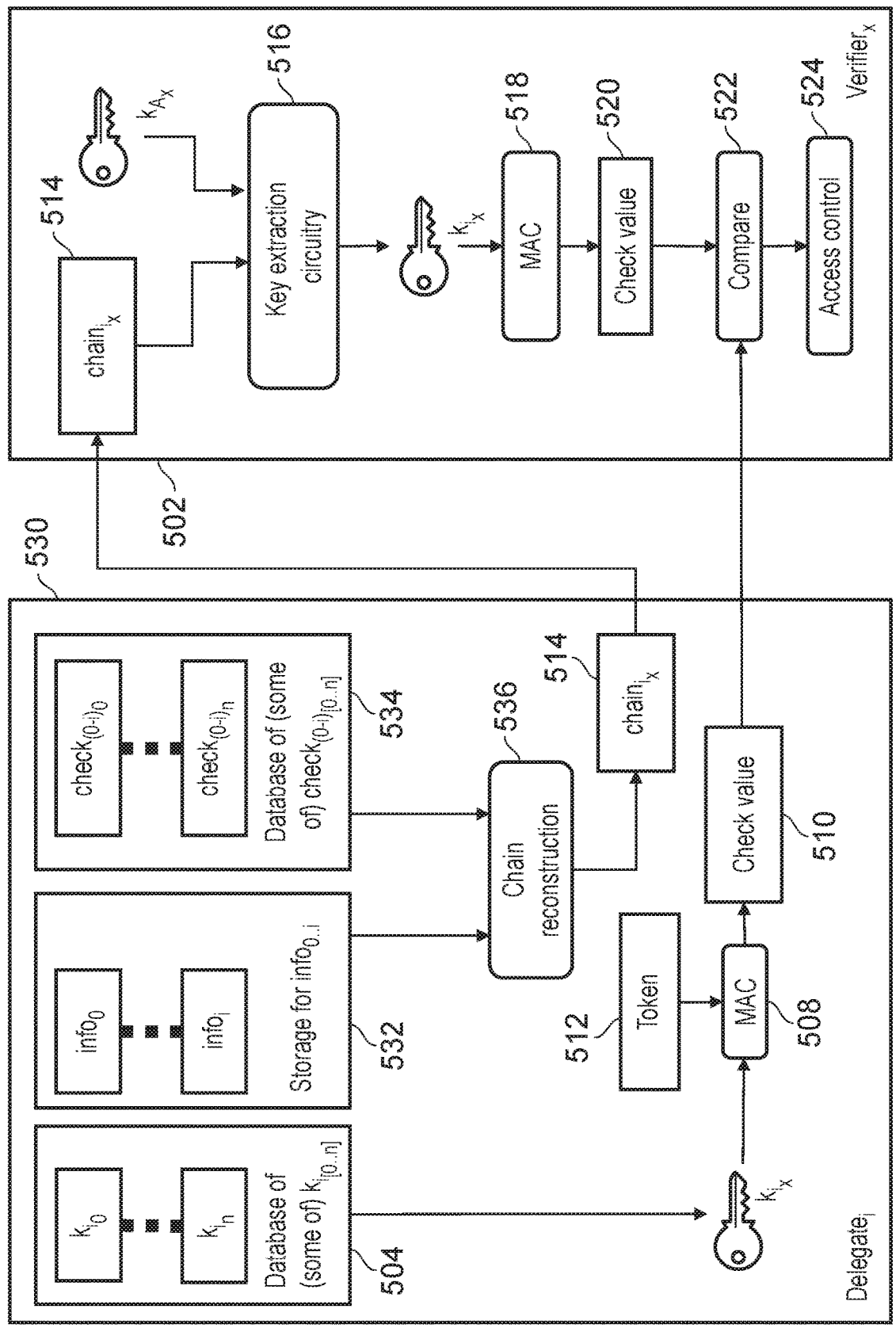
FIG. 13 schematically illustrates a variant on FIG. 12 in accordance with some embodiments, in which the delegate apparatus has unpacked the certificate chains which are specific to a number of target apparatuses in order to de-duplicate the stored information.

FIG. 13 schematically illustrates a variant on FIG. 12 in accordance with some embodiments, in which the apparatus 530 ($delegate_i$) has unpacked the certificate chains received in order to de-duplicate the stored information. This is based on the recognition that when multiple certificate chains are received, for which multiple respective anchor keys $k_{A\_[0 \ldots n]}$ have been used, there will be a significant level of redundancy between them, because although each is based on a different anchor key specific to a verifier (or group of verifiers), this only affects the check values in each chain and the remainder of each certificate (i.e. their delegation information blocks) are the same. Thus in the FIG. 13 embodiment, the chain database 506 of apparatus 500 in FIG. 12 is substituted by the delegation information block storage 532 and the check value database 534 in the apparatus 530. Accordingly the set of delegation information blocks ($info_0$ to $info_i$) need only be unpacked and stored from the first chain of certificates received by apparatus 530 ($delegate_i$). Conversely the set of check values for those delegation information blocks needs to be unpacked and stored for each chain of certificates (specific to a target verifier) received by apparatus 530 ($delegate_i$). As in the case of FIG. 12, two levels of subscript are used in the notation of FIG. 13 for the content of the databases 504 and 534, and the databases 504 and 534 are labelled as holding sets of derivative keys and certificate chains, which may not comprise all of the complete set of derivative keys and certificate chains for all verifiers [0 . . . n]. When the apparatus 530 seeks access to the apparatus 502 ($verifier_x$), and the required derivative key $k_{i\_x}$/set of check values is present in its databases, firstly chain reconstruction circuitry 536 reconstructs the required certificate chain $chain_{i\_x}$ (by appending the respective set of check values to the set of delegation information blocks, to form the set of certificates $crt_{i\_x}$ and then concatenating these to form $chain_{i\_x}$. The derivative key/certificate chain pair is then used to authenticate access to apparatus 502 as was described above in FIG. 12.

Figure 14:
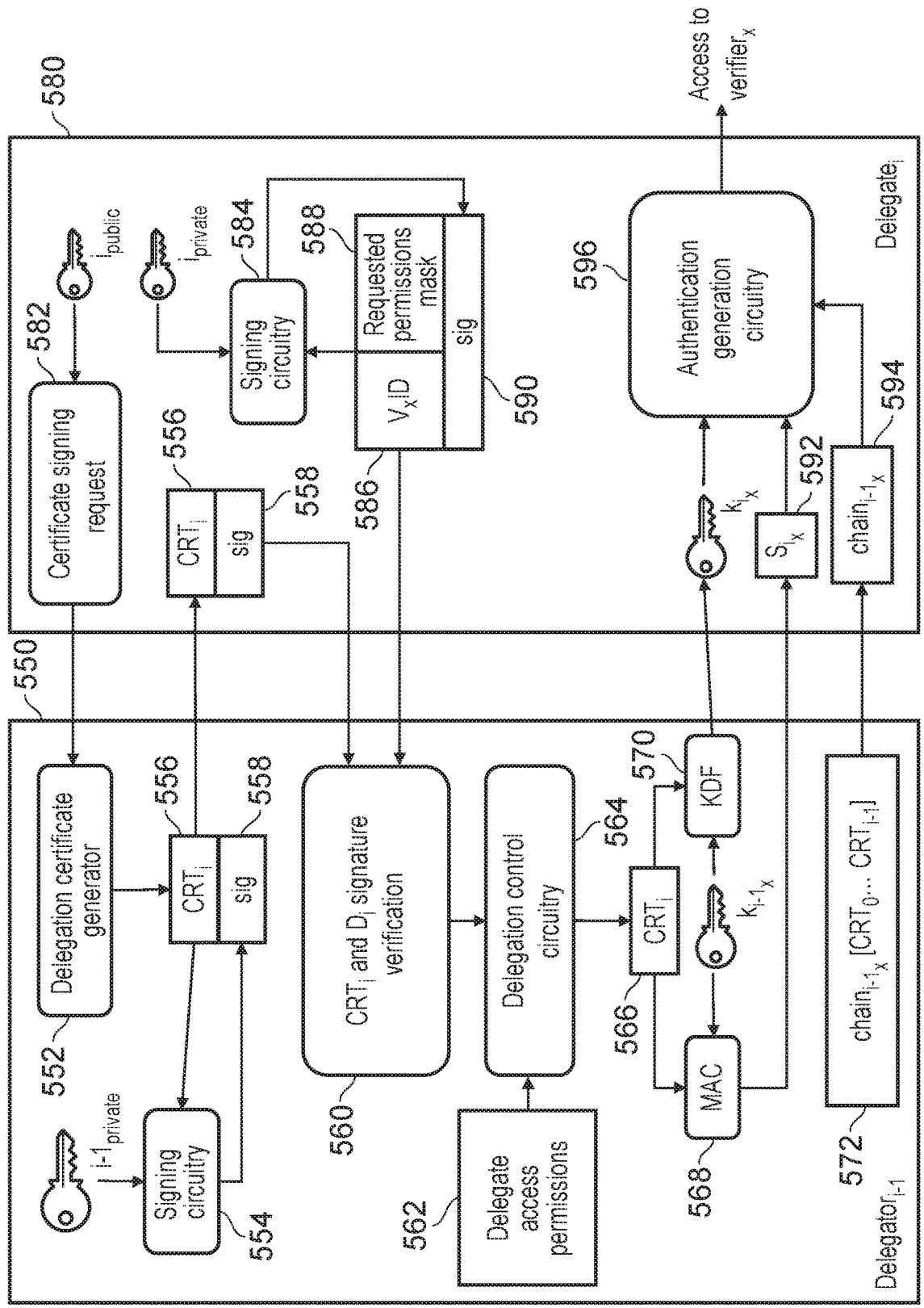
FIG. 14 schematically illustrates a delegator and a delegate in accordance with some embodiments, wherein the delegate is arranged to ask the delegator to delegate the necessary derivative key and certificate chain so that it can access a target apparatus for which there is a trusted root key specific to that target apparatus, where the delegate uses an asymmetric public-private key pair to allow the delegator to authenticate the delegate's request for access to the target apparatus before issuing the derivative key and certificate chain.

FIG. 14 schematically illustrates an arrangement in an example embodiment, comprising a delegator apparatus 550 and a delegate apparatus 580. These delegation entities in a serial delegation chain may be considered to be at any arbitrary adjacent pair of positions in the serial delegation chain. Here the apparatus 580 (delegate) wishes to access $verifier_x$ for which there is a specific anchor key and is not in possession of the required derivative key $k_{i\_x}$ and certificate chain $chain_{i\_x}$ to do so. Apparatus 580 ($delegate_i$) therefore requests the authorization to access $verifier_x$ from apparatus 550 (delegate$_{i-1}$). The delegate apparatus 580 uses an asymmetric public-private key pair to allow the delegator apparatus 550 to authenticate the delegate's request for access to the target apparatus before issuing the derivative key and certificate chain. The delegate apparatus 580 has certificate signing request generation circuitry 582, with which it send a certificate signing request to delegator apparatus 550 including its public key, key$_{i\_public}$. Delegator apparatus 550 has delegation certificate generation circuitry 552, with which it creates and signs a new certificate crt$_i$ 556 (in FIG. 15 this is shown as being done using a private key key$_{i-1\_private}$ in signing circuitry 554, although this could also be done using an oblivious verifiable pseudo-random function). It provides only this certificate (now with accompanying signature 558) to delegate apparatus 580. At some time point, delegate apparatus 580 determines that it needs access to verifier$_x$ and that it does not have access to k$_{i_x}$, nor does it have S$_{i_x}$ to be able to prove access rights. Delegate apparatus 580 then creates a request block including an identifier for verifier$_x$ 586 and a requested permissions mask 588 (other information could also be included). It uses signing circuitry 584 to generate a signature 590 using its public key key$_{i\_public}$. The delegate apparatus 580 presents crt$_i$ 556 and its signature 558, as well as its request block (the identifier for verifier$_x$ 586 and the requested permissions mask 588, signed by signature 590) to delegator apparatus 550. The delegator apparatus 550 uses authentication verification circuitry 560 to verify crt$_i$ and the signature of delegate apparatus 580 in the request block. Thus verified, delegation control circuitry 564 checks for local policy data (delegate access permissions 562), allowing delegate apparatus 580 to access verifier$_x$. This may be done using a logical conjunction of the requested permissions mask 588 and a local permissions mask, as will be described in more detail below with reference to FIG. 16. The delegator apparatus 550 then uses MAC circuitry 568 to MAC crt$_i$ (note: excluding the signature 558) with k$_{i-1_x}$ to create S$_{i_x}$. KDF circuitry 570 derives k$_{i_x}$ from k$_{i-1_x}$. The delegator apparatus 550 sends k$_{i_x}$ and S$_{i_x}$ to delegate apparatus 580 along with a certificate chain comprising all certificates crt$_j$, where j=[0 . . . i-1]. The delegate apparatus 580 can now use S$_{i_x}$ to prove its rights and to prove authenticity/secure access to verifier$_x$. Note that if delegator apparatus 550 does not have access to k$_{i-1_x}$, then it can itself act as described above for delegate$_i$, requesting permission to access verifier$_x$ from delegate$_{i-2}$ in the serial chain. If so required, such an access request may propagate all the way to the root authority.

Figure 15A:
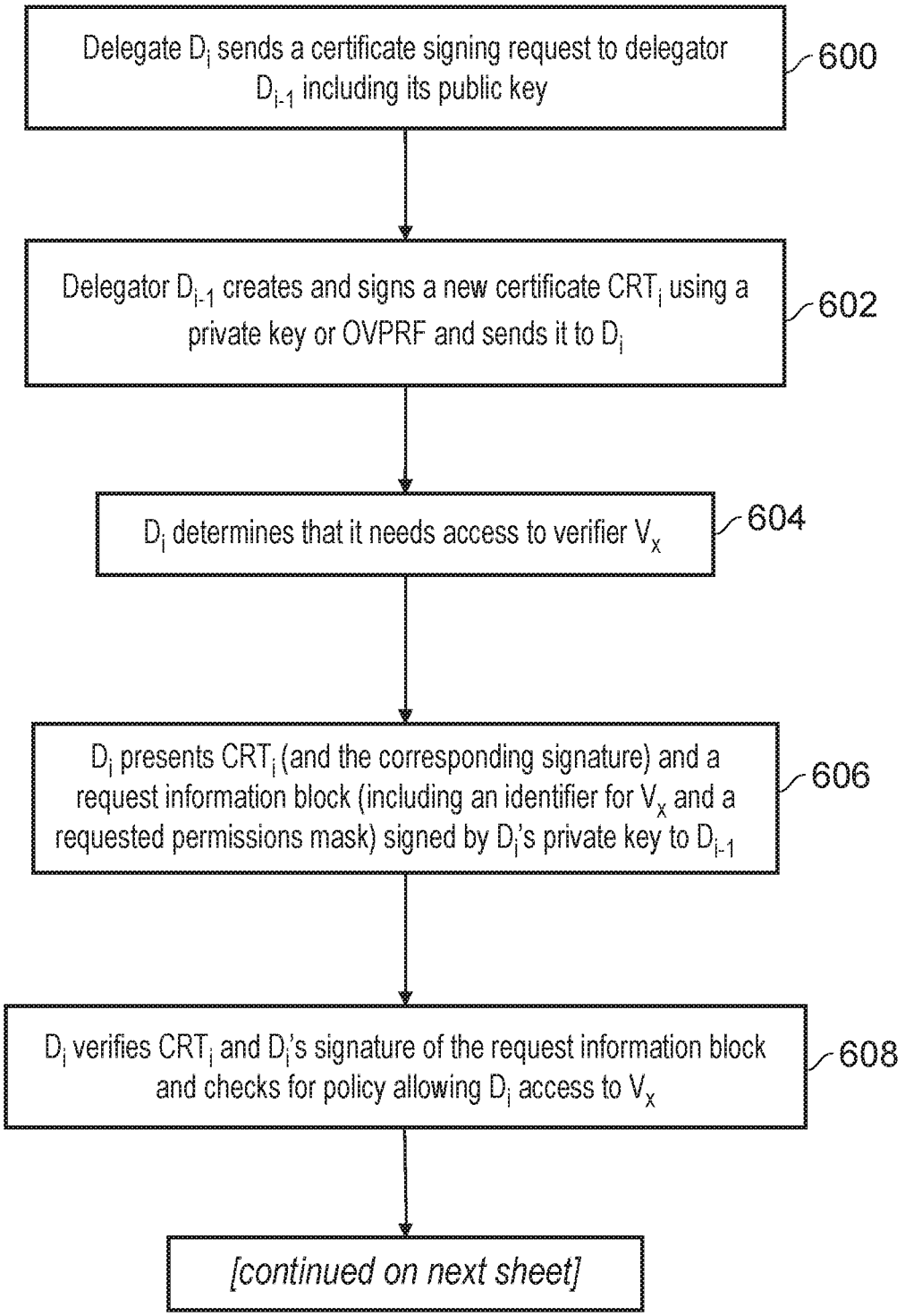
FIGS. 15A and 15B illustrate a flow diagram showing a sequence of steps which are taken in the method of some embodiments, when a delegator-delegate pair such as those shown in FIG. 14 interact.
Figure 15B:
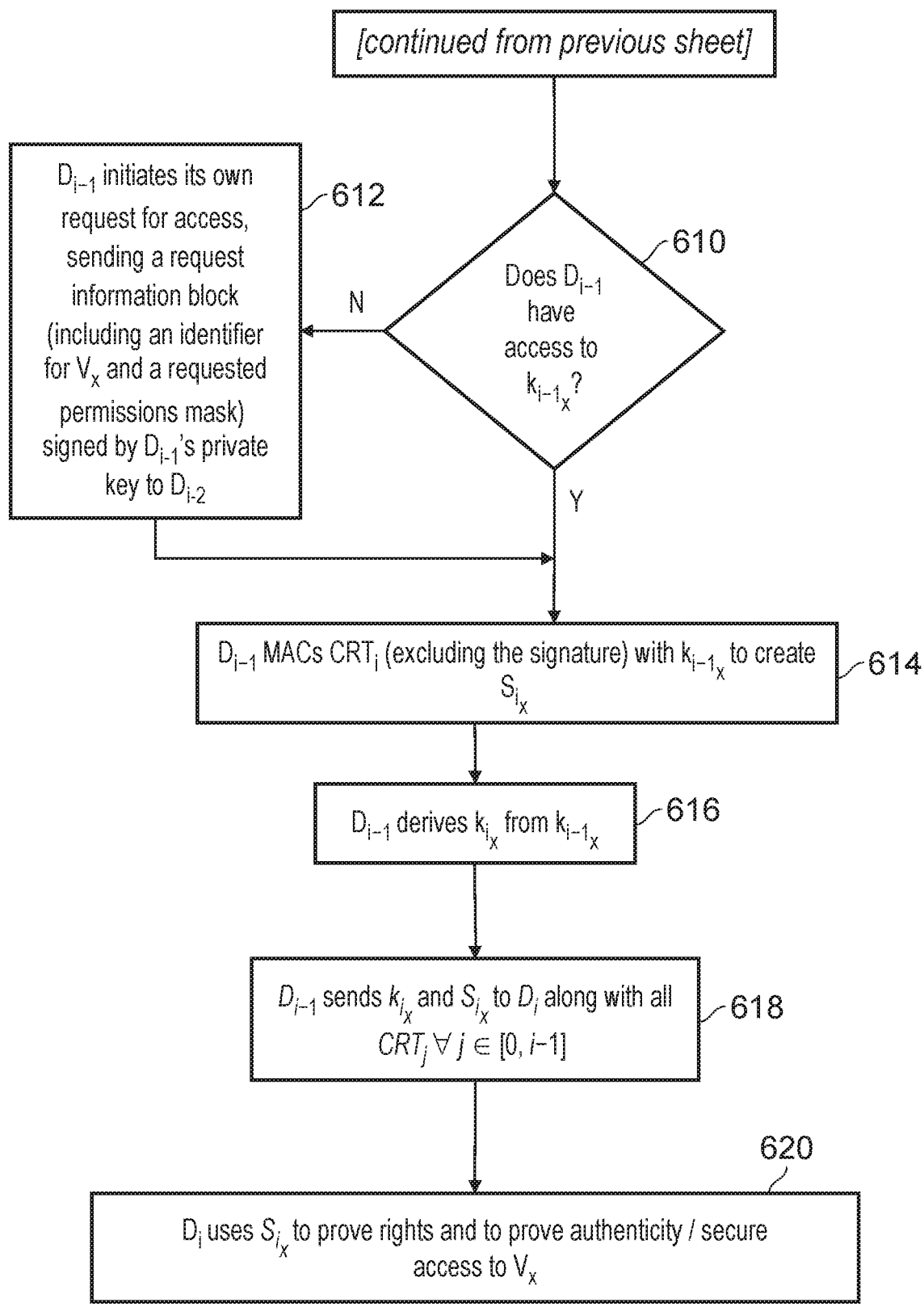

FIGS. 15A and 15B illustrate a flow diagram showing a sequence of steps which are taken in the method of some embodiments, when a delegator-delegate pair such as those shown in FIG. 14 interact. The flow begins at step 600, where delegate D$_i$ sends a certificate signing request to delegator D$_{i-1}$ including its public key, key$_{i\_public}$. At step 602, delegator D$_{i-1}$ creates and signs a new certificate crt$_i$ using a private key key$_{i-1\_private}$ or an oblivious verifiable pseudo-random function (OVPRF) and sends this certificate (now with accompanying signature) to delegate D$_i$. Then at step 604 delegate D$_i$ determines that it needs access to verifier V$_x$ (and that it does not have access to k$_{i_x}$ or S$_{i_x}$). At step 606 delegate D$_i$ creates a request block including an identifier for verifier V$_x$ and a requested permissions mask, where the request block is signed using its public key key$_{i\_public}$. D$_i$ sends crt$_i$ and its signature 558, as well as its request block (and its signature) to delegator D$_{i-1}$. At step 608 delegator D$_{i-1}$ verifies crt$_i$ and the signature of delegate apparatus 580 in the request block. Thus verified D$_{i-1}$ checks for local policy data allowing delegate D$_i$ access to verifier V$_x$. At step 610, delegator D$_{i-1}$ determines whether it has access to key k$_{i-1_x}$. If it does not, the flow branches to step 612, where delegator D$_{i-1}$ initiates its own request for access to verifier V$_x$ to be delegated to it from its own delegator D$_{i-2}$. Of course this process may branch further here, for access requests to be passed further and further up the serial delegation chain towards, or even reaching, the root authority. The branch to step 612 returns when delegator D$_{i-1}$ is in possession of key k$_{i-1_x}$. Next at step 614 delegator D$_{i-1}$ MACs crt$_i$ (excluding the signature) with k$_{i-1_x}$ to create S$_{i_x}$. Then at step 616 delegator D$_{i-1}$ uses its KDF to derive k$_{i_x}$ from k$_{i-1_x}$. At step 618 the delegator D$_{i-1}$ sends k$_{i_x}$ and S$_{i_x}$ to delegate D$_i$ along with a certificate chain comprising all certificates crt$_j$, where j=[0 . . . i-1]. Finally at step 620 delegate D$_i$ can then use S$_{i_x}$ to prove its rights and to prove authenticity/secure access to verifier V$_x$.

Figure 16:
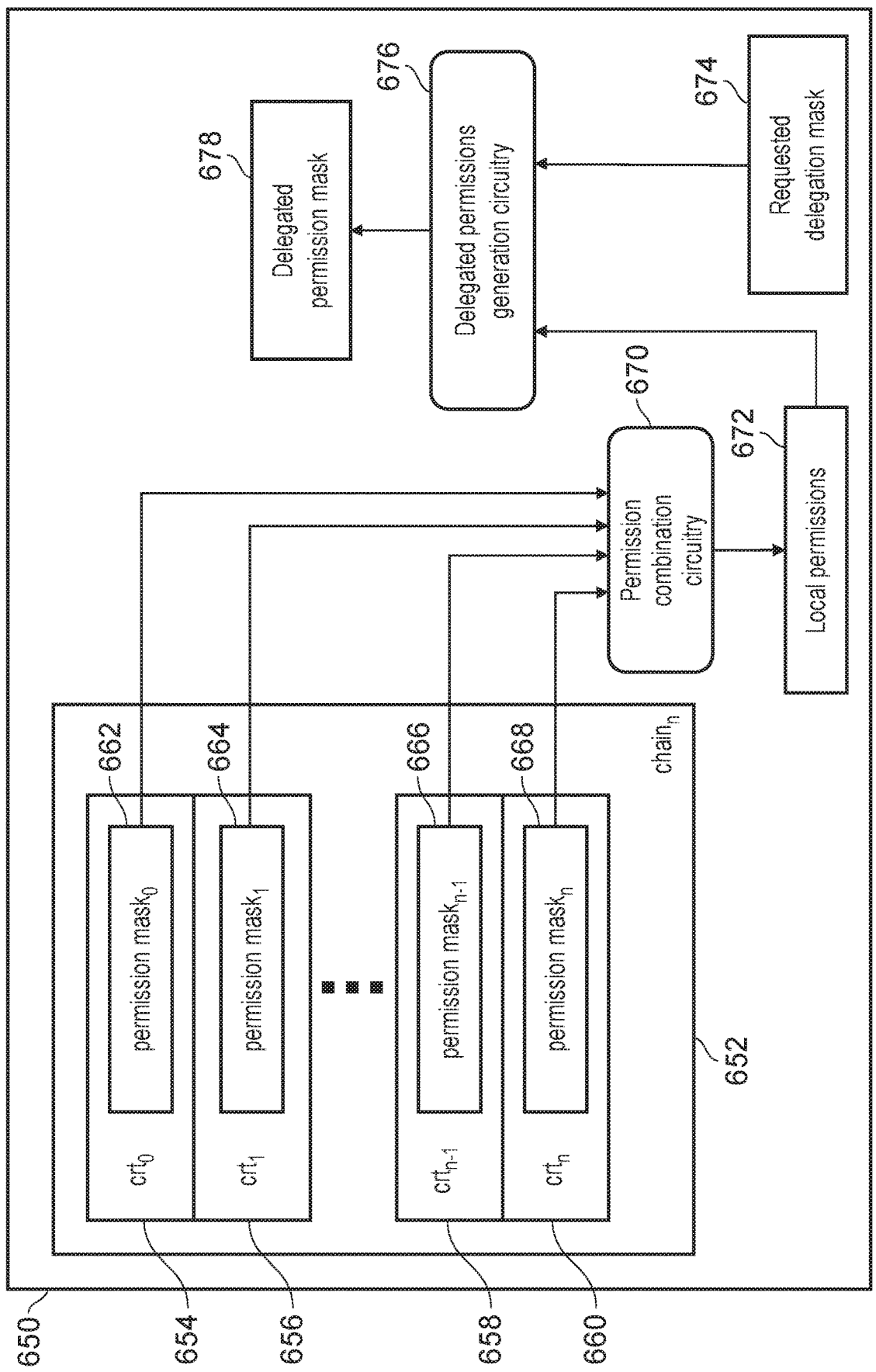
FIG. 16 schematically illustrates a delegator which determines its own local permissions on the basis of a set of permission masks received in a certificate chain and generates from those local permissions a delegated permissions mask for a subsequent delegate in accordance with some embodiments.

FIG. 16 schematically illustrates an apparatus 650 in accordance with some embodiments. The apparatus in possession of certificates chain$_n$ 652, comprising certificates 654, 656, 658, 660 crt$_0$ . . . crt$_n$. Each of the certificates comprises a respective permissions mask 662, 664, 666, 668, which may for example be a 128-bit value, where each bit corresponds to a certain access permission or operation permission which can be granted. The apparatus 650 comprises permission combination circuitry 670, which is arranged to combine the permission masks by logical conjunction in order to generate a local permission mask 672. In other words the permission masks are combined as: mask$_0$ & mask$_1$ & . . . & mask$_{n-1}$ & mask$_n$. This means that each stage of delegation through the serial chain can remove any permissions which were originally set given positions in the root permission mask (i.e. in permission mask$_0$ 654) by setting its own permission mask to have unset bits at those positions. However each delegation stage cannot enhance the set of permissions a delegated to it, since the logical conjunction of the set of permission masks means that a given permission mask position must be set at all delegation stages in order to remain valid in the local permission mask 672. The apparatus 650 can then make use of the local permission mask 672 to define its own operations. Furthermore, the apparatus 650 may receive a request for delegation of authorisation from a subsequent apparatus in the serial delegation chain. This is represented in FIG. 16 by the requested delegation mask 674. The apparatus 650 further comprises delegated permissions generation circuitry 676, which is arranged to generate a delegated permission mask 678 by logical conjunction of the local permission mask 672 and the requested delegation mask 674. The use of the logical conjunction by the delegated permissions generation circuitry 676 means that the apparatus 650 can at most delegate its own full set of local permissions.

Figure 17:
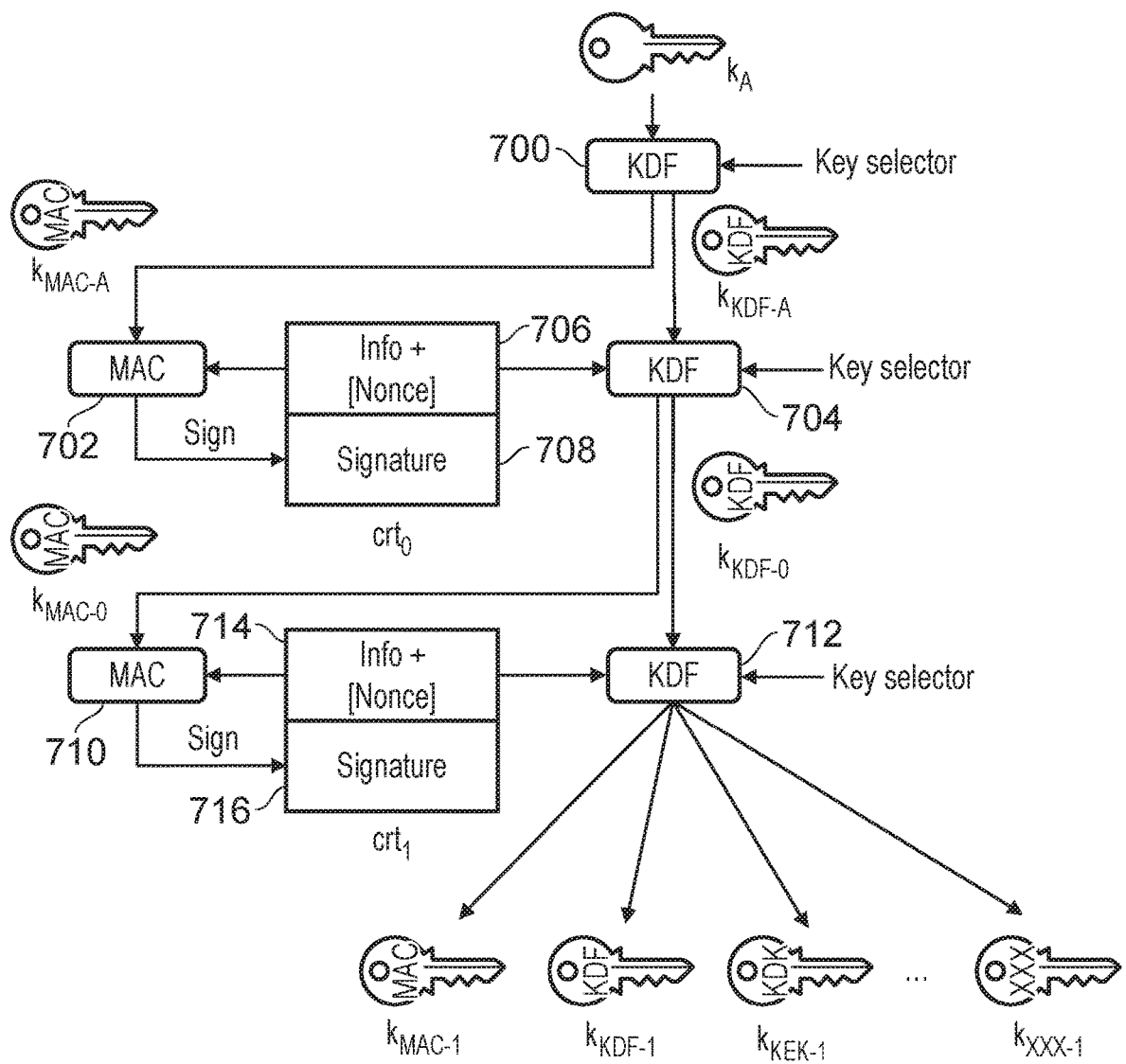
FIG. 17 schematically illustrates a variant in which per-purpose key derivation takes place in accordance with some embodiments.

FIG. 17 schematically illustrates a variant in which per-purpose key derivation takes place in accordance with some embodiments. The start of a serial chain of certificate and key generation is shown, starting with a trusted root key k$_A$. In a first step of the use of trusted root key k$_A$, a KDF 700 is used which takes anchor key k$_A$ as its primary input, but also a key selector signal. The key selector signal is switched such that a first variant of the KDF 700 is used to generate a key k$_{MAC-A}$ for use in the MAC function 702 and a second variant of the KDF 700 is used to generate a key k$_{KDF-A}$ for use in the KDF 704. As described above, for example with respect to FIGS. 2 and 3, the MAC function 702 is used to "sign" the delegation information block 706 by generating a check value ("signature") 708 and the KDF 704 is used for key derivation for the next delegation level. The KDF 704 thus takes anchor key variant k$_{KDF-A}$ as its primary input, but also takes a further key selector signal. The further key selector signal is switched such that a first variant of the KDF 704 is used to generate a key $k_{MAC-0}$ for use at the next delegation level in the MAC function 710 and a second variant of the KDF 704 is used to generate a key $k_{KDF-0}$ for use at the next delegation level in the KDF 712. The MAC function 710 is used to "sign" the delegation information block 714 by generating a check value ("signature") 716 and the KDF 704 is used for key derivation for the next delegation level. Keys may be generated for a range of purposes as shown in the figure, so that KDF 712 thus takes key $k_{KDF-0}$ as its primary input, but also has its own key selector signal. An arbitrary number of variants of the KDF 712 can therefore be supported and derivative keys for the next delegation level may be generated for an arbitrary range of purposes (such as MAC, KDF, key encryption (KEK), and so on).

Figure 18:
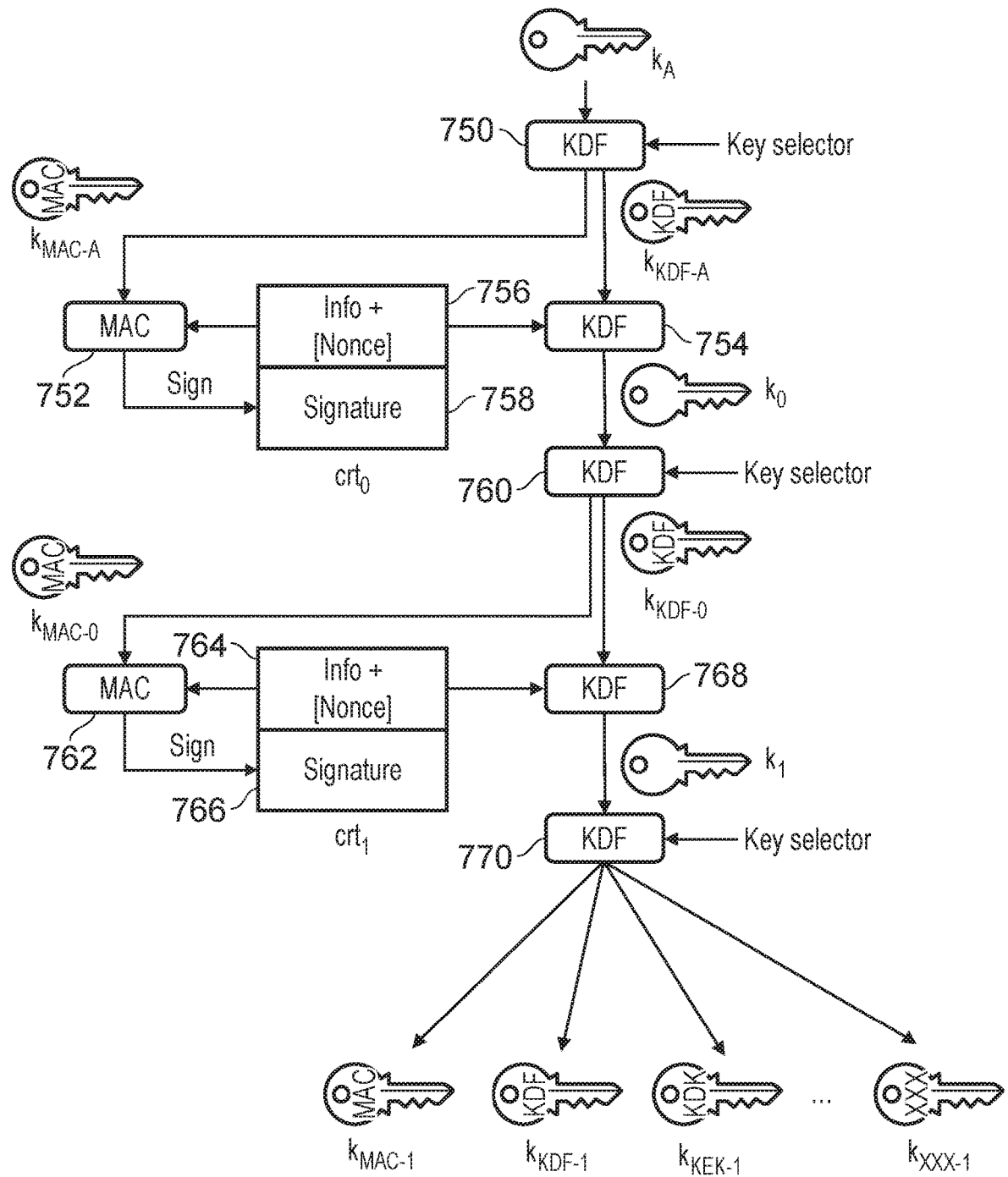
FIG. 18 schematically illustrates a variant in which per-certificate master keys are used in accordance with some embodiments.

FIG. 18 schematically illustrates a variant in which per-certificate master keys are used in accordance with some embodiments. The start of a serial chain of certificate and key generation is shown, starting with a trusted root key $k_A$. In a first step of the use of trusted root key $k_A$, a KDF 750 is used which takes anchor key $k_A$ as its primary input, but also a key selector signal. The key selector signal is switched such that a first variant of the KDF 750 is used to generate a key $k_{MAC-A}$ for use in the MAC function 752 and a second variant of the KDF 750 is used to generate a key $k_{KDF-A}$ for use in the KDF 754. The MAC function 752 is used to "sign" the delegation information block 756 by generating a check value ("signature") 758 and the KDF 754 is used to generate derivative key $k_0$. Key $k_0$ is then the primary input for KDF 760, which also takes a further key selector signal. The further key selector signal is switched such that a first variant of the KDF 760 is used to generate a key $k_{MAC-0}$ for use at the next delegation level in the MAC function 762 and a second variant of the KDF 760 is used to generate a key $k_{KDF-0}$ for use at the next delegation level in the KDF 768. The MAC function 762 is used to "sign" the delegation information block 764 by generating a check value ("signature") 766 and the KDF 768 is used to generate derivative key $k_1$ for the next delegation level. Key $k_1$ is then the primary input for KDF 770 and keys can be derived for a range of purposes as shown in the figure, so that KDF 770 (by variation of its own key selector signal) an arbitrary number of variants of the KDF 770 result in derivative keys for an arbitrary range of purposes (such as MAC, KDF, key encryption (KEK), and so on).

It should be noted that the embodiments mentioned above have primarily been described in terms of the interaction of hardware components, often embodied as circuitry components. This should not be interpreted as implying that the present techniques are limited to strictly hardware-based implementations, and any number of the circuitry components may be substituted by equivalent software routines executing within a suitable execution environment.

In brief overall summary of some of the above disclosed aspects, apparatuses, systems, methods, and software are disclosed for authorization delegation. In a participant device a derivative key is generated in dependence on a received key. An authenticity check value for a delegation information block is generated in dependence on the delegation information block and the received key. The derivative key is derived in dependence on the delegation information block and the received key. An extended certificate chain is created comprising a received certificate chain appended with a local certificate, which comprises the delegation information block and the authenticity check value.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   authorization delegation circuitry to generate a derivative key in dependence on a received key, wherein the authorization delegation circuitry comprises:
   authentication code generation circuitry to generate an authenticity check value for a delegation information block in dependence on the delegation information block and the received key; and
   key derivation circuitry to generate the derivative key in dependence on the delegation information block and the received key;
   certificate concatenation circuitry to generate an extended certificate chain, wherein the extended certificate chain comprises a received certificate chain appended with a local certificate, wherein the local certificate comprises the delegation information block and the authenticity check value; and
   key extraction circuitry to compute an extracted key in dependence on a secret anchor key and an encryption certificate chain, wherein computing the extracted key comprises an iterative process of multiple iterations, wherein each iteration comprises:
   extracting a certificate for the iteration from the encryption certificate chain;
   extracting an iteration delegation information block and an iteration authenticity check value from the certificate for the iteration;
   causing the authentication code generation circuitry to generate an iteration verification authenticity check value for the iteration delegation information block in dependence on the iteration delegation information block and an iteration key;
   verifying that the iteration verification authenticity check value matches the iteration authenticity check value; and
   causing the key derivation circuitry to generate a next key in dependence on the iteration delegation information block and the iteration key, wherein in a first iteration of the iterative process the iteration key is the secret anchor key and wherein in a last iteration of the iterative process the next key is the extracted key.

2. The apparatus as claimed in claim 1, further comprising:
data item authenticating circuitry to generate a data item check value for a data item in dependence on the data item and the derivative key.

3. The apparatus as claimed in claim 1, further comprising:
data item encryption circuitry to encrypt a data item in dependence on the data item and the derivative key.

4. The apparatus as claimed in claim 3, further comprising encrypted data transmission circuitry to transmit an encrypted data item encrypted by the data item encryption circuitry and the extended certificate chain to a recipient which holds a secret anchor key shared amongst multiple apparatuses.

5. The apparatus as claimed in claim 1, further comprising:
authenticity verification circuitry to perform authenticity verification for a received check value associated with a received data item and a received certificate chain, wherein the authenticity verification comprises:
causing the key extraction circuitry to compute the extracted key, wherein the received certificate chain is the encryption certificate chain; and
verifying that a verification check value generated by the authentication code generation circuitry in dependence on the received data item and the extracted key matches the received check value.

6. The apparatus as claimed in claim 1, further comprising:
data item encryption circuitry to perform encryption of a data item in dependence on the data item and the extracted key,
wherein encryption of the data item comprises:
causing the key extraction circuitry to compute the extracted key in dependence on the secret anchor key and an encryption certificate chain.

7. The apparatus as claimed in claim 1, further comprising:
data item decryption circuitry to perform decryption of an encrypted data item in dependence on the encrypted data item and the extracted key,
wherein decryption of the encrypted data item comprises:
causing the key extraction circuitry to compute the extracted key in dependence on the secret anchor key and an encryption certificate chain.

8. The apparatus as claimed in claim 1, further comprising:
permission setting circuitry to define a local permission mask, wherein each iteration of the iterative process of multiple iterations comprises extracting an iteration permission mask from the iteration delegation information block,
and the permission setting circuitry is arranged to generate the local permission mask using a logical conjunction of the iteration permission masks extracted in the multiple iterations of the iterative process.

9. The apparatus as claimed in claim 8, wherein the permission setting circuitry is arranged to define a delegated permission mask using a logical conjunction of the local permission mask and a requested delegation mask,
and wherein the certificate concatenation circuitry is arranged to generate the extended certificate chain comprising the encryption certificate chain appended with the local certificate, wherein the delegation information block in the local certificate comprises the delegated permission mask.

10. The apparatus as claimed in claim 1, further comprising:
purposive key generation circuitry to generate at least one further key in dependence on the received key, such that the apparatus has multiple keys comprising the received key and the at least one further key,
and wherein the authentication code generation circuitry and the key derivation circuitry are arranged to use different keys of the multiple keys.

11. A system for authorization delegation comprising:
multiple delegation entities, wherein each delegation entity of the multiple delegation entities comprises:
authorization delegation circuitry to generate a derivative key in dependence on a received key, wherein the authorization delegation circuitry comprises:
authentication code generation circuitry to generate an authenticity check value for a delegation information block in dependence on the delegation information block and the received key; and
key derivation circuitry to generate the derivative key in dependence on the delegation information block and the received key;
certificate concatenation circuitry to generate an extended certificate chain, wherein the extended certificate chain comprises a received certificate chain appended with a local certificate, wherein the local certificate comprises the delegation information block and the authenticity check value; and
key extraction circuitry to compute an extracted key in dependence on a secret anchor key and an encryption certificate chain, wherein computing the extracted key comprises an iterative process of multiple iterations, wherein each iteration comprises:
extracting a certificate for the iteration from the encryption certificate chain;
extracting an iteration delegation information block and an iteration authenticity check value from the certificate for the iteration;
causing the authentication code generation circuitry to generate an iteration verification authenticity check value for the iteration delegation information block in dependence on the iteration delegation information block and an iteration key;
verifying that the iteration verification authenticity check value matches the iteration authenticity check value; and
causing the key derivation circuitry to generate a next key in dependence on the iteration delegation information block and the iteration key,
wherein in a first iteration of the iterative process the iteration key is the secret anchor key and wherein in a last iteration of the iterative process the next key is the extracted key, and
wherein the multiple delegation entities are arranged in a serial chain, such that the derivative key and the extended certificate chain of an earlier delegation entity in the serial chain are the received key and the received certificate chain of a subsequent delegation entity in the serial chain.

12. The system for authorization delegation as claimed in claim 11, wherein a first delegation entity in the serial chain is arranged to use a secret anchor key shared amongst the multiple delegation entities as the received key.

13. The system for authorization delegation as claimed in claim 11,
wherein a last delegation entity in the serial chain is arranged to use the derivative key the extended certificate chain to authenticate access to a target device, wherein the access to the target device comprises at least one of:
provision of data from the last delegation entity to the target device; and
extraction of data from the target device to the last delegation entity.

14. The system for authorization delegation as claimed in claim 13, wherein the last delegation entity is at least one of:
a debugging device to perform debugging of the target device;
a secure boot control to control a secure boot process of the target device;
a firmware updater to control a firmware update process for the target device;
a data provider to provide the target device with data; and
a data requester to retrieve data from the target device.

15. The system for authorization delegation as claimed in claim 11, further comprising a root trust authority,
wherein each delegation entity is arranged to solicit the received key and the received certificate chain from the root trust authority.

16. The system for authorization delegation as claimed in claim 15, wherein each delegation entity is arranged to solicit the received key and the received certificate chain from the root trust authority without using the serial chain.

17. The system for authorization delegation as claimed in claim 15, wherein each delegation entity is arranged to request the received key and the received certificate chain from the root trust authority via the serial chain and is arranged to receive the received key and the received certificate chain via the serial chain.

18. The system for authorization delegation as claimed in claim 11, further comprising multiple verification entities, and wherein a first delegation entity in the serial chain is arranged to use a secret anchor key specific to a target verification entity of the multiple verification entities as the received key.

19. The system for authorization delegation as claimed in claim 18, wherein each delegation entity of the multiple delegation entities comprises verification entity specific storage,
wherein the verification entity specific storage comprises multiple entries, wherein each entry of the multiple entries is arranged to store: a verifier-specific received certificate chain and a verifier-specific received key.

20. The system for authorization delegation as claimed in claim 18, wherein each delegation entity of the multiple delegation entities comprises verification entity specific storage,
wherein the verification entity specific storage comprises multiple entries, wherein each entry of the multiple entries is arranged to store: a verifier-specific set of information blocks, a verifier-specific set of authenticity check values, and a verifier-specific received key.

21. The system for authorization delegation as claimed in claim 19, wherein the earlier delegation entity in the serial chain is arranged to provide the subsequent delegation entity in the serial chain with:
a verifier-specific extended certificate chain comprising the verifier-specific received certificate chain appended with the local certificate; and
a verifier-specific derivative key generated by the key derivation circuitry in dependence on the delegation information block and the verifier-specific received key,
in dependence on local policy data defining access permission for access by the subsequent delegation entity to the target verification entity.

22. The system for authorization delegation as claimed in claim 18, wherein the earlier delegation entity in the serial chain and the subsequent delegation entity in the serial chain are arranged to perform an authorization delegation process which comprises:
the subsequent delegation entity having a public key paired with a private key and sending the public key to the earlier delegation entity;
the earlier delegation entity providing the subsequent delegation entity with a signed delegation information block;
the subsequent delegation entity sending the signed certificate and a request to the earlier delegation entity for access to the target verification entity, wherein the request is signed using the subsequent delegation entity's private key;
the earlier delegation entity verifying the signed certificate and the signed request;
the earlier delegation entity verifying that local permission data allows the subsequent delegation entity to access the target verification entity;
the earlier delegation entity generating an authenticity check value specific to the target verification entity in dependence on the certificate unique to the subsequent delegation entity and a received key specific to the target verification entity;
the earlier delegation entity generating a derivative key specific to the target verification entity in dependence on the certificate unique to the subsequent delegation entity and the received key specific to the target verification entity; and
the earlier delegation entity sending the derivative key specific to the target verification entity, the authenticity check value specific to the target verification entity, and the received certificate chain.

23. A method for authorization delegation comprising:
receiving a received key;
receiving a received certificate chain;
generating an authenticity check value for a delegation information block in dependence on the delegation information block and the received key;
generating a derivative key in dependence on the delegation information block and the received key;
generating an extended certificate chain, wherein the extended certificate chain comprises the received certificate chain appended with a local certificate, wherein the local certificate comprises the delegation information block and the authenticity check value; and
computing an extracted key in dependence on a secret anchor key and an encryption certificate chain, wherein computing the extracted key comprises an iterative process of multiple iterations, wherein each iteration comprises:
extracting a certificate for the iteration from the encryption certificate chain;
extracting an iteration delegation information block and an iteration authenticity check value from the certificate for the iteration;
causing the authentication code generation circuitry to generate an iteration verification authenticity check value for the iteration delegation information block in dependence on the iteration delegation information block and an iteration key;

verifying that the iteration verification authenticity check value matches the iteration authenticity check value; and causing the key derivation circuitry to generate a next key in dependence on the iteration delegation information block and the iteration key, wherein in a first iteration of the iterative process the iteration key is the secret anchor key and wherein in a last iteration of the iterative process the next key is the extracted key.

24. A computer-readable storage medium comprising program instructions which when executed on a data processing device, cause the data processing device to carry out the method of claim 23.

* * * * *